United States Patent
Hinduja et al.

(10) Patent No.: US 11,798,321 B2
(45) Date of Patent: Oct. 24, 2023

(54) DRIVER SCORE DETERMINATION FOR VEHICLE DRIVERS

(71) Applicant: ANI TECHNOLOGIES PRIVATE LIMITED, Bengaluru (IN)

(72) Inventors: Hitesh Hinduja, Thane (IN); Gaurav Agarwal, Bangalore (IN)

(73) Assignee: ANI TECHNOLOGIES PRIVATE LIMITED, Bengaluru (IN)

( * ) Notice: Subject to any disclaimer, the term of this patent is extended or adjusted under 35 U.S.C. 154(b) by 401 days.

(21) Appl. No.: 16/951,829

(22) Filed: Nov. 18, 2020

(65) Prior Publication Data

US 2022/0068044 A1  Mar. 3, 2022

(30) Foreign Application Priority Data

Aug. 28, 2020 (IN) .............................. 202041037197

(51) Int. Cl.
| | |
|---|---|
| *G07C 5/00* | (2006.01) |
| *G06Q 40/08* | (2012.01) |
| *G07C 5/04* | (2006.01) |
| *G07C 5/08* | (2006.01) |
| *B60W 50/14* | (2020.01) |

(Continued)

(52) U.S. Cl.
CPC .............. *G07C 5/008* (2013.01); *B60W 40/09* (2013.01); *B60W 50/14* (2013.01); *G06F 18/23* (2023.01); *G06F 18/24317* (2023.01); *G06F 18/256* (2023.01); *G06Q 40/08* (2013.01); *G07C 5/04* (2013.01); *G07C 5/0808* (2013.01); *B60W 2050/146* (2013.01); *G06Q 50/30* (2013.01)

(58) Field of Classification Search
None
See application file for complete search history.

(56) References Cited

U.S. PATENT DOCUMENTS 5,570,087 A  * 10/1996  Lemelson ............... G07C 5/085
                                                     340/936
6,227,862 B1 *  5/2001  Harkness ................. G09B 9/05
                                                     434/258

(Continued)

FOREIGN PATENT DOCUMENTS

| AU | 2017100444 A4 | * | 5/2017 | ............ B60W 40/09 |
| CN | 105809263 A | * | 7/2016 | ............ G06Q 10/02 |

(Continued)

*Primary Examiner* — Kevin R Steckbauer
(74) *Attorney, Agent, or Firm* — CHIP LAW GROUP

(57) ABSTRACT

A method for determining a driver score for a first driver of a first vehicle. The method comprises receiving, from a database server, first maintenance data, first booking data, and first vehicle data associated with a plurality of vehicles, and first driver behavioral data for a plurality of drivers. The method includes obtaining a plurality of features and a plurality of feature values based on the first maintenance data, the first booking data, the first vehicle data, and the first driver behavioral data. The method further includes segregating the plurality of feature values into a plurality of clusters. The method includes training a classifier to determine the driver score. The method further includes receiving from the database server, a first dataset associated with the first vehicle and the first driver. The method includes determining the driver score for the first driver based on an output of the trained classifier.

18 Claims, 7 Drawing Sheets

(51) Int. Cl.
  *B60W 40/09* (2012.01)
  *G06F 18/243* (2023.01)
  *G06F 18/23* (2023.01)
  *G06F 18/25* (2023.01)
  *G06Q 50/30* (2012.01)

(56) References Cited

U.S. PATENT DOCUMENTS

| | | | | |
|---|---|---|---|---|
| 6,909,947 B2* | 6/2005 | Douros | G09B 9/052 | |
| | | | 701/34.4 | |
| 7,149,607 B2* | 12/2006 | Dorey | G01M 17/007 | |
| | | | 701/1 | |
| 7,389,178 B2* | 6/2008 | Raz | G09B 19/167 | |
| | | | 701/56 | |
| 7,659,827 B2* | 2/2010 | Gunderson | G08G 1/16 | |
| | | | 348/148 | |
| 7,694,115 B1* | 4/2010 | Porras | H04L 63/1408 | |
| | | | 709/224 | |
| 7,769,499 B2* | 8/2010 | McQuade | G07C 5/008 | |
| | | | 701/1 | |
| 8,117,049 B2* | 2/2012 | Berkobin | G06Q 40/08 | |
| | | | 701/29.6 | |
| 8,188,887 B2* | 5/2012 | Catten | G08G 1/096791 | |
| | | | 340/936 | |
| 8,314,708 B2* | 11/2012 | Gunderson | G06Q 40/08 | |
| | | | 340/576 | |
| 8,554,468 B1* | 10/2013 | Bullock | B60W 50/0097 | |
| | | | 340/439 | |
| 8,577,703 B2* | 11/2013 | McClellan | G07C 5/008 | |
| | | | 705/7.42 | |
| 8,606,492 B1* | 12/2013 | Botnen | G07C 5/008 | |
| | | | 701/123 | |
| 8,630,768 B2* | 1/2014 | McClellan | G08G 1/096725 | |
| | | | 340/439 | |
| 8,854,199 B2 | 10/2014 | Cook | | |
| 8,880,239 B2* | 11/2014 | Kleve | G06Q 10/02 | |
| | | | 705/76 | |
| 8,963,740 B2* | 2/2015 | Koukoumidis | G08G 1/144 | |
| | | | 340/426.2 | |
| 8,989,914 B1* | 3/2015 | Nemat-Nasser | G07C 5/08 | |
| | | | 701/1 | |
| 8,996,234 B1* | 3/2015 | Tamari | B60W 40/09 | |
| | | | 701/123 | |
| 9,047,721 B1* | 6/2015 | Botnen | G07C 5/008 | |
| 9,081,650 B1* | 7/2015 | Brinkmann | B60W 40/09 | |
| 9,461,992 B2* | 10/2016 | Outwater | A61B 5/4824 | |
| 9,558,656 B1* | 1/2017 | Brinkmann | G08G 1/0125 | |
| 9,589,393 B2* | 3/2017 | Botnen | G07C 5/085 | |
| 9,672,734 B1* | 6/2017 | Ratnasingam | H04W 4/44 | |
| 10,089,880 B2* | 10/2018 | Bender | G08G 1/0133 | |
| 10,131,363 B2* | 11/2018 | Schaffer | B60W 10/04 | |
| 10,146,769 B2* | 12/2018 | Chen | G06F 40/30 | |
| 10,168,705 B2* | 1/2019 | Kazemi | G06N 20/00 | |
| 10,209,708 B2* | 2/2019 | Hoye | B60W 30/182 | |
| 10,217,358 B2* | 2/2019 | Zydek | G08G 1/096775 | |
| 10,234,858 B2* | 3/2019 | Cashier | G08G 1/167 | |
| 10,235,881 B2* | 3/2019 | Nishi | G01S 5/0072 | |
| 10,297,092 B2* | 5/2019 | Schaffer | B60W 40/08 | |
| 10,334,199 B2* | 6/2019 | Teixeira | G06F 3/012 | |
| 10,360,793 B1* | 7/2019 | Costantini | G08G 1/0112 | |
| 10,407,078 B2* | 9/2019 | Ratnasingam | G06Q 40/08 | |
| 10,417,343 B2* | 9/2019 | Chen | G06F 40/30 | |
| 10,417,714 B1* | 9/2019 | Christensen | G08G 1/0133 | |
| 10,429,841 B2* | 10/2019 | Yang | G06N 20/00 | |
| 10,431,089 B1* | 10/2019 | Nguyen | G07C 5/02 | |
| 10,467,487 B1* | 11/2019 | Wang | B60R 1/005 | |
| 10,518,783 B2* | 12/2019 | Tanimichi | G08G 1/16 | |
| 10,521,733 B2* | 12/2019 | Snyder | B60W 40/08 | |
| 10,522,038 B2* | 12/2019 | Bielby | G08G 1/04 | |
| 10,545,499 B2* | 1/2020 | Hoye | B60W 50/10 | |
| 10,586,448 B2* | 3/2020 | Sholingar | B60Q 9/00 | |
| 10,613,548 B2* | 4/2020 | Zhang | G05D 1/0285 | |
| 10,625,745 B1* | 4/2020 | Tremblay | G06V 20/58 | |
| 10,640,117 B2* | 5/2020 | Polisson | G06Q 30/0283 | |
| 10,665,127 B2* | 5/2020 | Gaither | B60W 40/06 | |
| 10,677,686 B2* | 6/2020 | Phillips | G05D 1/0088 | |
| 10,683,017 B1* | 6/2020 | Kruse | G08G 1/096775 | |
| 10,762,363 B2* | 9/2020 | Watanabe | G06V 20/582 | |
| 10,783,780 B2* | 9/2020 | Zydek | G08G 1/09675 | |
| 10,793,161 B2* | 10/2020 | Gaither | B60W 30/18072 | |
| 10,832,140 B2* | 11/2020 | Kim | G06N 3/084 | |
| 10,839,678 B2* | 11/2020 | Urano | B60W 40/09 | |
| 10,894,542 B2* | 1/2021 | Kline | G06Q 10/0635 | |
| 10,909,866 B2* | 2/2021 | Jacobus | G08G 1/096716 | |
| 10,919,537 B2* | 2/2021 | Bennett | B60W 50/12 | |
| 10,940,860 B2* | 3/2021 | Kanoh | B60W 60/0055 | |
| 10,971,013 B2* | 4/2021 | Bielby | G08G 1/052 | |
| 10,997,527 B2* | 5/2021 | Snyder | B60W 40/08 | |
| 11,001,273 B2* | 5/2021 | Duale | B60W 30/095 | |
| 11,024,165 B2* | 6/2021 | Julian | G07C 5/0808 | |
| 11,048,832 B2* | 6/2021 | Alvarez | G06F 30/15 | |
| 11,074,813 B2* | 7/2021 | Julian | G08G 1/0137 | |
| 11,113,961 B2* | 9/2021 | Julian | G06V 20/56 | |
| 11,124,188 B2* | 9/2021 | Maus | B60W 30/18018 | |
| 11,132,916 B2* | 9/2021 | Deakins | G09B 9/05 | |
| 11,157,503 B2* | 10/2021 | Kim | G06F 16/248 | |
| 11,183,082 B2* | 11/2021 | Gaither | B60W 50/14 | |
| 11,214,280 B2* | 1/2022 | Myers | B60W 50/14 | |
| 11,226,636 B2* | 1/2022 | Zhang | G05D 1/0088 | |
| 11,244,579 B2* | 2/2022 | Deakins | G09B 9/05 | |
| 11,250,009 B2* | 2/2022 | Kim | G06Q 30/0202 | |
| 11,254,320 B2* | 2/2022 | Gaither | B60W 40/09 | |
| 11,290,858 B2* | 3/2022 | Kelleman | G08G 1/017 | |
| 11,294,370 B2* | 4/2022 | Hoye | B60W 40/08 | |
| 11,294,372 B2* | 4/2022 | Rosati | B60Q 9/00 | |
| 11,314,209 B2* | 4/2022 | Campos | G08G 1/0133 | |
| 11,322,018 B2* | 5/2022 | Julian | G06V 20/38 | |
| 11,328,210 B2* | 5/2022 | Mondello | G06N 3/088 | |
| 11,332,149 B1* | 5/2022 | Harvey | B60W 40/09 | |
| 11,335,196 B2* | 5/2022 | Moerbe | G08G 1/096791 | |
| 11,341,866 B2* | 5/2022 | Urano | B60W 40/09 | |
| 11,355,007 B2* | 6/2022 | Narihira | G07C 5/0841 | |
| 11,373,466 B2* | 6/2022 | Golov | B60R 21/0136 | |
| 11,377,113 B2* | 7/2022 | Sippl | G06V 40/20 | |
| 11,392,796 B2* | 7/2022 | Curewitz | G06N 3/063 | |
| 11,410,475 B2* | 8/2022 | Golov | B60R 21/0136 | |
| 11,416,760 B2* | 8/2022 | Selvanayagam | G06N 7/01 | |
| 11,447,147 B2* | 9/2022 | Subramanian | G06V 20/56 | |
| 11,458,974 B2* | 10/2022 | McNew | B60W 40/09 | |
| 11,565,680 B2* | 1/2023 | Snyder | B60W 40/08 | |
| 2002/0116156 A1* | 8/2002 | Remboski | G07C 5/0808 | |
| | | | 702/188 | |
| 2002/0120374 A1* | 8/2002 | Douros | B60W 40/09 | |
| | | | 340/439 | |
| 2004/0210353 A1* | 10/2004 | Rice | G08G 1/052 | |
| | | | 701/1 | |
| 2006/0112103 A1* | 5/2006 | Besserman | G06Q 10/10 | |
| 2006/0161315 A1* | 7/2006 | Lewis | G08G 1/20 | |
| | | | 701/1 | |
| 2006/0200277 A1* | 9/2006 | Yoshida | G09B 9/052 | |
| | | | 701/1 | |
| 2006/0253307 A1* | 11/2006 | Warren | G06Q 40/08 | |
| | | | 705/4 | |
| 2007/0005404 A1* | 1/2007 | Raz | G06Q 40/00 | |
| | | | 705/4 | |
| 2008/0105482 A1* | 5/2008 | Yamaguchi | G05B 15/02 | |
| | | | 180/271 | |
| 2008/0122603 A1* | 5/2008 | Plante | G07C 5/085 | |
| | | | 340/439 | |
| 2008/0255722 A1* | 10/2008 | McClellan | B60R 25/102 | |
| | | | 340/439 | |
| 2009/0024419 A1* | 1/2009 | McClellan | G06Q 40/08 | |
| | | | 705/4 | |
| 2009/0132294 A1* | 5/2009 | Haines | G06Q 40/08 | |
| | | | 701/117 | |
| 2010/0157061 A1* | 6/2010 | Katsman | G07C 5/008 | |
| | | | 348/149 | |
| 2011/0090075 A1* | 4/2011 | Armitage | G07C 5/0816 | |
| | | | 340/439 | |
| 2011/0320492 A1* | 12/2011 | Inghelbrecht | G06Q 40/08 | |
| | | | 707/E17.014 | |

(56) References Cited

U.S. PATENT DOCUMENTS

| | | | | |
|---|---|---|---|---|
| 2012/0066007 A1* | 3/2012 | Ferrick | | G06Q 50/30 |
| | | | | 705/4 |
| 2013/0073114 A1* | 3/2013 | Nemat-Nasser | | B60W 40/09 |
| | | | | 382/104 |
| 2013/0138460 A1* | 5/2013 | Schumann, Jr. | | G06Q 50/30 |
| | | | | 705/4 |
| 2014/0052672 A1* | 2/2014 | Wagner | | G06Q 10/06398 |
| | | | | 705/500 |
| 2014/0129053 A1* | 5/2014 | Kleve | | G07F 17/0057 |
| | | | | 701/2 |
| 2014/0129113 A1* | 5/2014 | Van Wiemeersch | | F02D 28/00 |
| | | | | 701/1 |
| 2014/0223531 A1* | 8/2014 | Outwater | | A61B 5/18 |
| | | | | 726/7 |
| 2015/0161913 A1* | 6/2015 | Dominguez | | G09B 19/167 |
| | | | | 434/66 |
| 2015/0213555 A1 | 7/2015 | Barfield | | |
| 2015/0243111 A1* | 8/2015 | Botnen | | G07C 5/02 |
| | | | | 701/99 |
| 2015/0306763 A1* | 10/2015 | Meier | | B25J 19/023 |
| | | | | 901/3 |
| 2016/0283963 A1* | 9/2016 | Zafiroglu | | G06Q 30/02 |
| 2017/0200061 A1* | 7/2017 | Julian | | G06V 20/56 |
| 2017/0305434 A1* | 10/2017 | Ratnasingam | | B60W 50/14 |
| 2018/0268621 A1 | 9/2018 | Oz | | |
| 2020/0353937 A1* | 11/2020 | Bennett | | B60W 40/09 |
| 2020/0357198 A1* | 11/2020 | Bennett | | G06F 16/9035 |
| 2022/0068044 A1* | 3/2022 | Hinduja | | G06F 18/23 |

FOREIGN PATENT DOCUMENTS

| | | | | |
|---|---|---|---|---|
| CN | 107784405 A | * | 3/2018 | ....... G06Q 10/06315 |
| CN | 109690606 A | * | 4/2019 | ......... G06Q 10/0635 |
| CN | 110533094 A | | 12/2019 | |
| CN | 110648075 A | | 1/2020 | |
| EP | 3455822 A1 | | 3/2019 | |
| GB | 2551872 A | * | 1/2018 | ............ B60W 40/09 |
| KR | 2020032893 A | * | 3/2020 | ............ G06Q 50/10 |
| WO | WO-2022044047 A1 | * | 3/2022 | ............ B60W 40/09 |

* cited by examiner

DRIVER SCORE DETERMINATION FOR VEHICLE DRIVERS

CROSS-RELATED APPLICATIONS

This application claims priority of Indian Non-Provisional Application No. 202041037197, filed Aug. 28, 2020, the contents of which are incorporated herein by reference.

FIELD

Various embodiments of the disclosure relate generally to data processing. More specifically, various embodiments of the disclosure relate to methods and systems for determining a driver score for a driver of a vehicle.

BACKGROUND

Technological advancements in the last few decades have opened doors for various types of on-demand transportation services. Such on-demand transportation services allow an individual to book a vehicle as per requirement. Success of a transportation service is directly related to condition of deployed vehicles and behavior of drivers driving those vehicles. To ensure steady performance, the vehicles may undergo regular maintenance and servicing. Further, professional and caring drivers tend to be attentive towards maintenance of the vehicles. Therefore, well-maintained vehicles exhibit seamless performance and have longer life-span as compared to poorly maintained vehicles. In an example, a caring driver may diligently take a vehicle for scheduled maintenances and prevent the vehicle from sudden breakdowns and damages. In another example, an uncaring driver may tend to skip scheduled maintenances, commit counterfeits, and may cause frequent accidents. In another example, a driver may be conducting forgery and may not accept bookings for the transportation service. Such behavior of the driver may not only cause financial loss to a transportation service provider, but may also lead to a poor travelling experience for the passengers who travel in the vehicle of such driver. Therefore, it becomes essential to track behavior of the drivers towards their vehicles and transportation service provider.

Presently, a driver's behavior is tracked by receiving feedbacks from the passengers and maintenance records of a vehicle of the driver. However, relying on the feedbacks from the passengers and the maintenance records may not be the most optimal approach for tracking the behavior of the driver. In one example, a feedback from a passenger may be specific to a ride and does not include the behavior of the driver when the vehicle is not booked for the ride. In some scenarios, the passengers may provide incorrect feedbacks or no feedbacks at all. Further, the maintenance records may not consider driver's performance or negligence on the road, and sometimes, the driver may not even take the vehicle for the maintenance, leading to lack of maintenance records. Therefore, use of the maintenance records and the feedbacks of passengers may not be adequate to track the behavior of the driver.

In light of the foregoing, there exists a need for a technical and reliable solution that overcomes the above-mentioned problems and allows for accurate and efficient tracking of driver's behavior towards a vehicle and a corresponding transportation service provider.

SUMMARY

Methods for determining a driver score for a driver of a vehicle are provided substantially as shown in, and described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Certain embodiments of the disclosure may be found in disclosed systems and methods for determining a driver score for a first driver of a first vehicle. Exemplary aspects of the disclosure provide methods for determining the driver score for the first driver of the first vehicle. The methods include various operations that are executed by a server (for example, an application server) to determine the driver score for the first driver of the first vehicle. In an embodiment, the server may be configured to receive, from a database server, first maintenance data, first booking data, and first vehicle data associated with a plurality of vehicles, and first driver behavioral data for a plurality of drivers of the plurality of vehicles. The server may be configured to obtain a plurality of features and a plurality of feature values corresponding to the plurality of features based on the first maintenance data, the first booking data, the first vehicle data, and the first driver behavioral data. The plurality of features are indicative of driver performance. The server is further configured to segregate the plurality of feature values into a plurality of clusters and train a classifier based on the plurality of clusters to determine the driver score. The server is configured to receive, from the database server, a first dataset associated with the first vehicle and the first driver. The first dataset is provided as an input to the trained classifier. The server is configured to determine the driver score for the first driver based on an output of the trained classifier.

Thus, the methods and systems of the disclosure provide a solution for determining the driver score for the first driver of the first vehicle. The methods and systems significantly improve understanding of driver's behavior towards the vehicle and a transportation service provider. Beneficially, the methods and systems also substantially reduce human effort and interference required for analyzing the driver's behavior. Further, the disclosed methods and systems determine the driver score considering both recent and historical information associated with the vehicle and the driver during driver's tenure of association with the transportation service provider. Further, determination of the driver score ensures better performance of the driver resulting in longer life span of the vehicle. Also, onboarding, penalizing and incentivizing the driver based on the driver score ensures a responsible behavior from the driver, leading to reduced frequency of unscheduled maintenance requests and cost of maintenance of the vehicle. Further, the disclosed methods and systems ensure that the driver is accountable towards the vehicle as well as the transportation service provider.

Figure 1A:
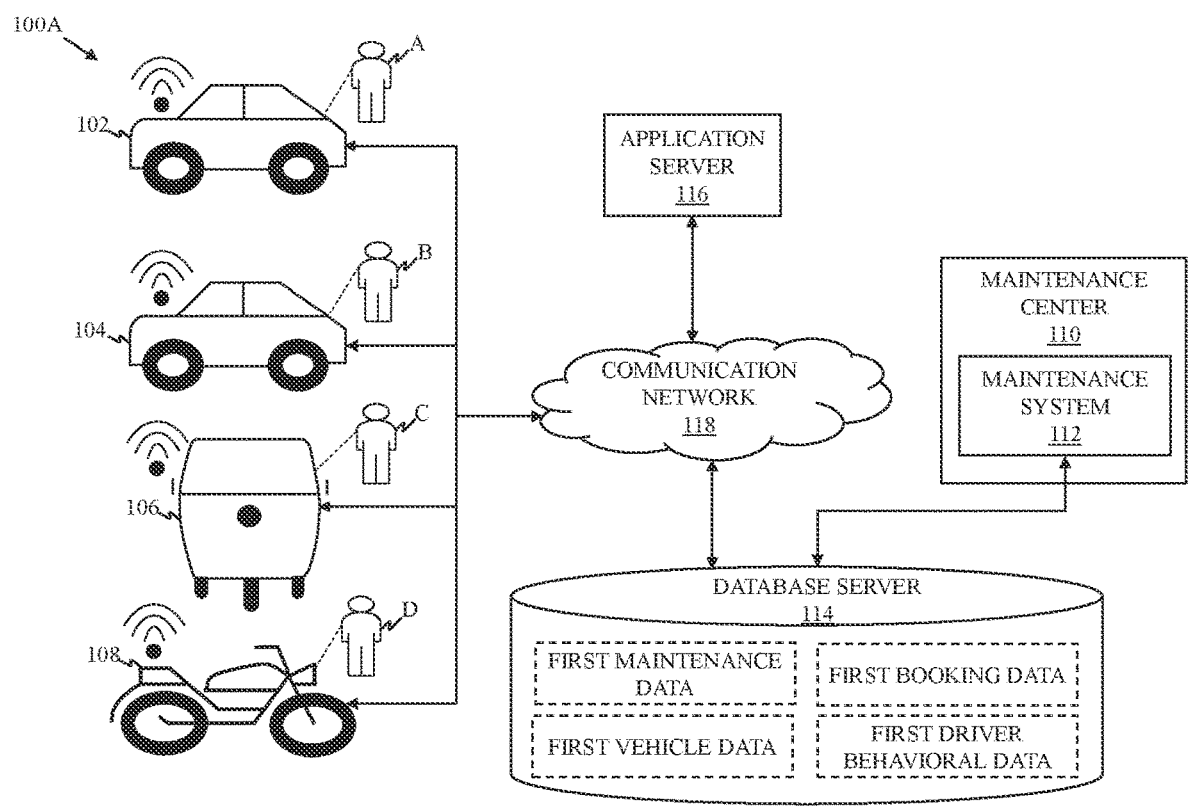
FIG. 1A is a block diagram that illustrates a system environment for determining driver scores for vehicle drivers, in accordance with an exemplary embodiment of the disclosure.

FIG. 1A is a block diagram that illustrates a system environment 100A for determining driver scores for vehicle drivers, in accordance with an exemplary embodiment of the disclosure. The system environment 100A includes a plurality of vehicles 102-108 associated with corresponding plurality of drivers A-D, a maintenance center 110 having a maintenance system 112, a database server 114, an application server 116, and a communication network 118. Examples of the communication network 118 may include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and a combination thereof. Various entities (such as the plurality of vehicles 102-108, the maintenance system 112, the database server 114, and the application server 116) in the system environment 100A may be coupled to the communication network 118 in accordance with various wired and wireless communication protocols, such as Transmission Control Protocol and Internet Protocol (TCP/IP), User Datagram Protocol (UDP), Long Term Evolution (LTE) communication protocols, or any combination thereof. In one example, the plurality of vehicles 102-108 may be coupled to the communication network via one of a telematics device, an on-board diagnostics device (OBD), or a driver device.

The plurality of vehicles 102-108 are modes of transport that are driven, by the plurality of drivers A-D, respectively. The plurality of vehicles 102-108 may include suitable logic, circuitry, interfaces and/or code, executable by the circuitry, that may be configured to control and perform one or more operations with driving assistance from the respective plurality of drivers A-D. In an embodiment, the plurality of vehicles 102-108 may be associated with a transportation service provider (e.g., a cab service provider, an on-demand transportation service provider, or the like) to cater to travelling requirements of various passengers. Examples of the plurality of vehicles 102-108 may include, but are not limited to, an automobile, a bus, a car, an auto rickshaw, and a bike. For the sake of brevity, the plurality of vehicles 102-108 are shown to include two four-wheeler vehicles 102 and 104, a three-wheeler vehicle 106, and a two-wheeler vehicle 108. Each of the plurality of drivers A-D may have different style of driving and attitude towards the respective plurality of vehicles 102-108. The style of driving and attitude towards each of the plurality of vehicles 102-108 driven by the respective plurality of drivers A-D significantly affect health and life span of the plurality of vehicles 102-108 and profitability of the transportation service provider.

The maintenance center 110 is an entity (for example, a place, an organization, or the like) that provides a platform for physical inspection of a plurality of components and the performance of the plurality of vehicles 102-108. The plurality of vehicles 102-108 may be examined at the maintenance center 110 on a regular basis such as weekly, monthly, annually, or so forth. The maintenance center 110 may include the maintenance system 112. The maintenance system 112 may include suitable logic, circuitry, interfaces, and/or code, that may be configured to control and execute one or more operations for performing troubleshooting and maintenance of the plurality of components of the plurality of vehicles 102-108. The maintenance system 112 may be configured to collect maintenance data of each of the plurality of vehicles 102-108 over a first time-interval. The maintenance data collected over the first time-interval is termed as the first maintenance data. The maintenance system 112 may be further configured to perform operations for storing first maintenance data (such as service and repair data) associated with the plurality of vehicles 102-108 in the database server 114. The first maintenance data may include information pertaining to a total repair and maintenance cost incurred by each of the plurality of drivers A-D, an overall cost incurred due to accidents caused by each of the plurality of drivers A-D, a repair count of each of the plurality of vehicles 102-108, a count of breakdowns of each of the plurality of vehicles 102-108, and a cost per unit distance incurred for one or more components of each of the plurality of vehicles 102-108 by the respective plurality of drivers A-D. The first maintenance data may be further indicative of past services, repairs, and damages faced by each of the plurality of vehicles 102-108. The first maintenance data may further include a log of a count of negligence incidents associated with each of the plurality of drivers A-D and a count of unscheduled maintenance requested by each of the plurality of drivers A-D for the respective plurality of vehicles 102-108. Examples of negligence incidents may include, but are not limited to, ignoring an issue with an alternator of the plurality of vehicles 102-108, pressing brakes and/or clutches of the plurality of vehicles 102-108 very hard, or the like. A high count of negligence incidents indicates insincere and careless attitude of the plurality of drivers A-D towards the respective plurality of vehicles 102-108. Therefore, the first maintenance data is an indicator of sincerity and awareness of the plurality of drivers A-D while driving the respective plurality of vehicles 102-108.

The database server 114 may include suitable logic, circuitry, interfaces, and/or code, executable by the circuitry, that may be configured to perform one or more operations for collecting and storing the first maintenance data, first booking data, first vehicle data associated with the plurality of vehicles 102-108 and first driver behavioral data associated with the plurality of drivers A-D. The database server 114 may collect the first maintenance data, the first booking data, the first vehicle data associated with the plurality of vehicles 102-108 and the first driver behavioral data associated with the plurality of drivers A-D, over a first time-interval, from each of the plurality of vehicles 102-108 and the maintenance database 120. Examples of the database server 114 may include a cloud-based database, a local database, a distributed database, a database management system (DBMS), or the like.

Figure 2A:
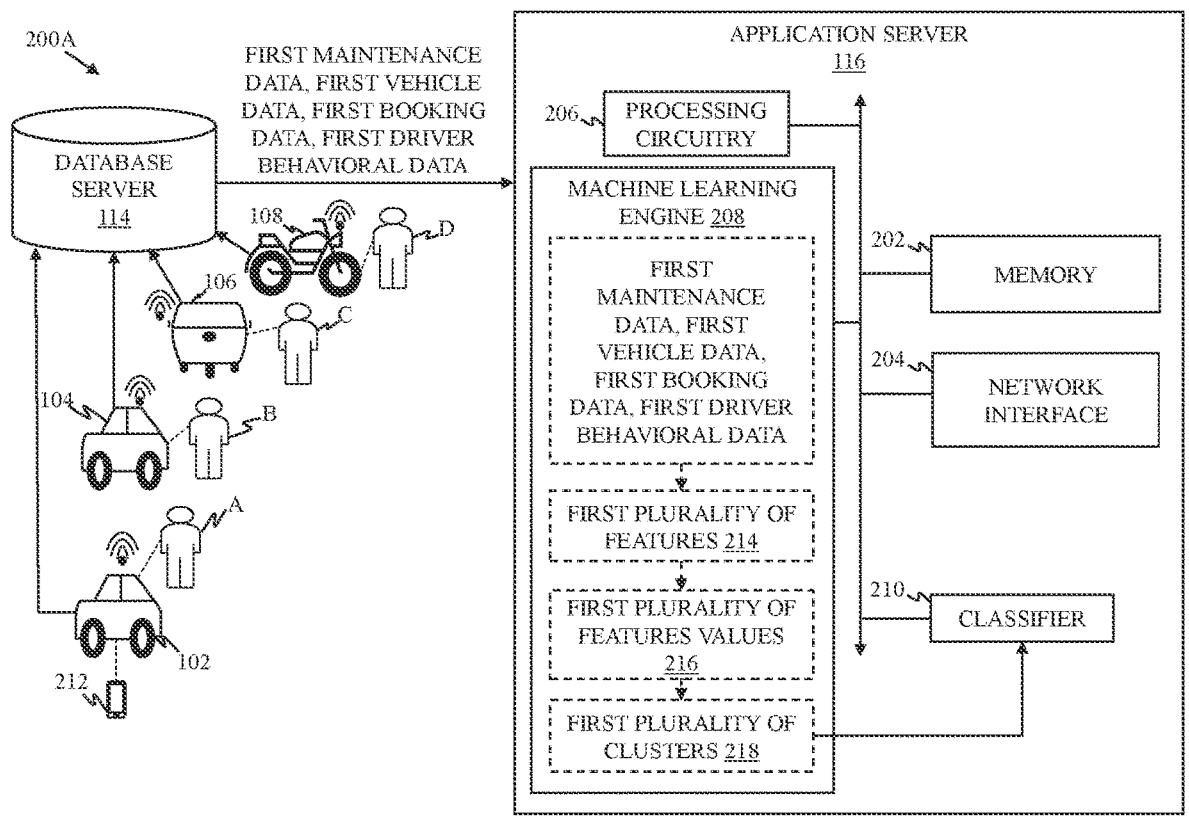
FIG. 2A is a schematic diagram that illustrates an exemplary scenario for training a classifier for determining driver scores for vehicle drivers, in accordance with an exemplary embodiment of the disclosure.

The first booking data includes ride booking details for each of the plurality of vehicles 102-108. The first booking data may be indicative of lean and peak booking hours of each of the plurality of vehicles 102-108, an average count of bookings per day of each of the plurality of vehicles 102-108, monthly earning of each of the plurality of drivers A-D, and distance driven per day by each of the plurality of drivers A-D. The distance driven per day by the plurality of drivers A-D may include a dry run distance driven by each of the plurality of drivers A-D, a trip distance driven by each of the plurality of drivers A-D, and an excess distance driven by each of the plurality of drivers A-D. In one embodiment, the database server 114 may receive real-time booking data from the driver device (as shown in FIG. 2A) associated with each of the plurality of vehicles 102-108. The real-time booking data collected over the first time-interval is referred to as the first booking data. Examples of the driver device may include a cell-phone, a laptop, a tablet, a phablet, or the like. In another embodiment, the database server 114 may receive the first booking data from the transportation service provider.

Vehicle data of each of the plurality of vehicles 102-108 is indicative of a tenure of association with the transportation service provider for the corresponding driver A-D, a make of the corresponding vehicle 102-108, a vehicle model of the corresponding vehicle 102-108, a region of operation of the corresponding vehicle 102-108, an odometer reading of the corresponding vehicle 102-108, and an age of the corresponding vehicle 102-108. The vehicle data collected for each of the plurality of vehicles 102-108 over the first time-interval is collectively referred to as the first vehicle data. Beneficially, using the first vehicle data of the plurality of vehicles 102-108 ensures that any of the plurality of drivers A-D is not held accountable for an issue caused because of the make of each of the plurality of vehicles 102-108, the vehicle model of each of the plurality of vehicles 102-108, the region of operation of each of the plurality of vehicles 102-108, or the like. Further, considering the tenure of each of the plurality of drivers A-D and the odometer reading of each of the plurality of vehicles 102-108 ensures that each of the plurality of drivers A-D are scored only for a duration during which they have driven their corresponding plurality of vehicles 102-108.

Driver behavioral data of each of the plurality of drivers A-D is indicative of a count of accidents caused by the corresponding driver A-D, a timeliness of scheduled maintenances of the corresponding vehicle 102-108, and a count of counterfeit incidents caused by the corresponding driver A-D. The driver behavioral data of each of the plurality of drivers A-D collected over the first time-interval is collectively referred to as the first driver behavioral data. Beneficially, the first driver behavioral data is an indicator of accountability and professionalism of each of the plurality of drivers A-D. The database server 114 may be configured to receive the first driver behavioral data from one of the maintenance system 112 and the transportation service provider.

The application server 116 may include suitable logic, circuitry, interfaces, and/or code, executable by the circuitry, that may be configured to perform one or more operations for determining driver scores for vehicle drivers, e.g., the plurality of drivers A-D or drivers of other vehicles. The application server 116 may be configured to communicate with the database server 114, the maintenance system 112, and the driver devices associated with the plurality of vehicles 102-108 via the communication network 118. Examples of the application server 116 may include a cloud-based server, a local server, a group of centralized servers, a group of distributed servers, or the like. The application server 116 may be configured to operate in two modes such as a training mode and an implementation mode. The application server 116 may operate in the training mode for training a classifier (as shown in FIG. 2A) to determine a driver score for a driver, e.g., the plurality of drivers A-D or the drivers of other vehicles. After the classifier is trained, the application server 116 may operate in the implementation mode for determining driver scores for any of the plurality of drivers A-D or the drivers of other vehicles.

During the training mode, the application server 116 may be configured to receive, from the database server 114, the first maintenance data, the first booking data, the first vehicle data associated with the plurality of vehicles 102-108 and the first driver behavioral data associated with each of the plurality of drivers A-D. The application server 116 may be configured obtain a plurality of features based on the first maintenance data, the first booking data, the first vehicle data, and the first driver behavioral data. The plurality of features are indicators of driver performance. The plurality of features may include the repair and maintenance cost incurred by each of the plurality of drivers A-D and the cost per unit distance incurred by each of the plurality of drivers A-D for the one or more components of each of the plurality of vehicles 102-108. The plurality of features may further include the count of counterfeit incidents caused by each of the plurality of drivers A-D, the overall cost incurred due to one or more accidents caused by each of the plurality of drivers A-D, the repair count of each of the plurality of vehicles 102-108, the count of breakdowns of each of the plurality of vehicles 102-108, and the count of unscheduled maintenance requested by each of the plurality of drivers A-D. The plurality of features may further include the monthly earning of each of the plurality of drivers A-D, the lean and peak booking hours of each of the plurality of vehicles 102-108, the average count of bookings per day for each of the plurality of vehicles 102-108, an average count of booking cancelations per day for each of the plurality of drivers A-D, and the distance driven per day by each of the plurality of drivers A-D. The distance driven per day by each of the plurality of drivers A-D may include the dry run distance driven by each of the plurality of drivers A-D, the trip distance driven by each of the plurality of drivers A-D, and the excess distance driven by each of the plurality of drivers A-D. The plurality of features may further include the tenure of association of each of the plurality of drivers A-D with the transportation service provider, the make of each of the plurality of vehicles 102-108, the vehicle model of each of the plurality of vehicles 102-108, the region of operation of each of the plurality of vehicles 102-108, the odometer reading of each of the plurality of vehicles 102-108, and the age of each of the plurality of vehicles 102-108. The plurality of features may further include the count of accidents of the plurality of vehicles 102-108 that were caused by the corresponding plurality of drivers A-D, the timeliness of scheduled maintenances of each of the plurality of vehicles 102-108, and the count of negligence incidents caused by each of the plurality of drivers A-D.

The application server 116 may be further configured to obtain a plurality of feature values corresponding to each of the plurality of features based on the first maintenance data, the first booking data, the first vehicle data, and the first driver behavioral data. The plurality of feature values may include a plurality of moving average values, a plurality of moving standard deviation values, and a plurality of cumulative sum values. For example, the plurality of moving average values are obtained for each of the plurality of features by processing the first maintenance data, the first booking data, the first vehicle data, and the first driver behavioral data. For example, one of the plurality of features is the count of accidents of the plurality of vehicles 102-108 caused by the corresponding plurality of drivers A-D. In such a scenario, the plurality of feature values may include various moving average values, moving standard deviation values, and cumulative sum values for the count of accidents of the plurality of vehicles 102-108 caused by the corresponding plurality of drivers A-D. In another example, one of the plurality of features is the count of counterfeit incidents caused by each of the plurality of drivers A-D. In such a scenario, the plurality of feature values may include various moving average values, moving standard deviation values, and cumulative sum values for the count of counterfeit incidents caused by each of the plurality of drivers A-D.

The application server 116 may be further configured to segregate the plurality of feature values into a plurality of clusters. For example, those feature values of the plurality of feature values that are indicators of good driver performance are segregated into a first cluster. Similarly, those feature values that are indicators of average driver performance are segregated into a second cluster and the remaining feature values are segregated into a third cluster to indicate bad (or substandard) driver performance. The application server 116 may label each cluster based on a driver performance indicated thereby. For example, the first cluster may be labeled as good driver as the first cluster includes feature values indicating good driver performance. Similarly, the second cluster may be labeled as average driver as the second cluster includes feature values indicating average driver performance. The third cluster may be labeled as bad (or substandard) driver as the third cluster includes feature values indicating bad or substandard driver performance. The application server 116 may be further configured to train the classifier based on the plurality of clusters or the plurality of labeled clusters. After the classifier is trained, the application server 116 may be configured to operate in the implementation mode.

During the implementation mode, the application server 116 may be configured to receive, from the database server 114, a first dataset associated with a first vehicle and a first driver. In an embodiment, the first vehicle may be one of the plurality of vehicles 102-108 and the first driver may be one of the plurality of drivers A-D. In another embodiment, the first vehicle may be a vehicle that is different from the plurality of vehicles 102-108 and the first driver may be different from the plurality of drivers A-D. The first dataset includes second maintenance data, second booking data, and second vehicle data associated with the first vehicle, and second driver behavioral data for the first driver. In one embodiment, the application server 116 may be configured to receive a portion of the first dataset from a driver device (shown in FIG. 2) associated the first vehicle. For example, the application server 116 may be configured to receive the second booking data from the driver device associated with the first vehicle. In another example, the application server 116 may be configured to receive the second vehicle data from the driver device associated with the first vehicle.

The second maintenance data may include information pertaining to a cost per unit distance incurred by the first driver of the first vehicle, a count of counterfeit incidents caused by the first driver, an overall cost incurred due to one or more accidents caused by the first driver, a repair count of the first vehicle, a count of breakdown of the first vehicle, and a count of unscheduled maintenance requested by the first driver. The second booking data may be indicative of a monthly earning of the first driver, lean and peak booking hours of the first vehicle, an average count of bookings per day for the first vehicle, and a distance driven per day by the first vehicle. The distance driven per day by the first vehicle may include a dry run distance driven by the first driver, a trip distance driven by the first driver, and an excess distance driven by the first driver. The second vehicle data may be indicative of a tenure of the first driver, a make of the first vehicle, a vehicle model of the first vehicle, a region of operation of the first vehicle, an odometer reading of the first vehicle, and an age of the first vehicle. The second driver behavioral data may include information pertaining to a count of accidents caused by the first driver, a timeliness of scheduled maintenances of the first vehicle, and a count of negligence incidents caused by the first driver. The application server 116 may be configured to provide the first dataset as an input to the trained classifier to determine a driver score of the first driver of the first vehicle. The application server 116 is configured to determine the driver score for the first driver based on an output of the trained classifier. The driver score of the first driver may be indicative of a performance and a profitability of the first driver. The application server 116 may be further configured to select, based on the driver score of the first driver, one of a plurality of outcomes for the first driver. The plurality of outcomes may include onboarding the first driver onto the transportation service platform associated with the application server 116, incentivizing the first driver, penalizing the first driver, accepting a maintenance request of the first driver, or rejecting the maintenance request of the first driver. For example, the application server 116 may select to incentivize the first driver for having a very high driver score and penalize another driver for having a very low driver score. Various components of the application server 116 and operations performed by the application server 116 are explained in detail in conjunction with FIGS. 2A and 2B.

Figure 1B:
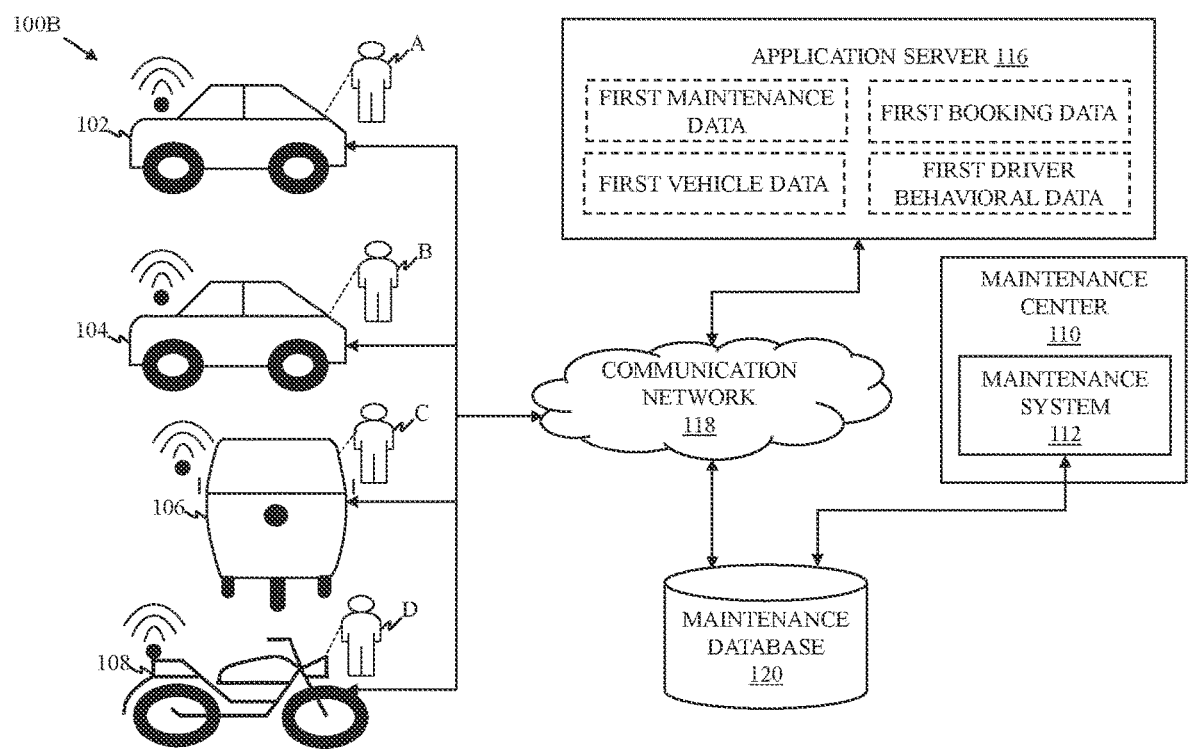
FIG. 1B is a block diagram that illustrates another system environment for determining driver scores for vehicle drivers, in accordance with another exemplary embodiment of the disclosure.

FIG. 1B is a block diagram that illustrates another system environment 100B for determining driver scores for vehicle drivers, in accordance with another exemplary embodiment of the disclosure. The system environment 100B includes the plurality of vehicles 102-108 associated with the plurality of drivers A-D respectively, the maintenance center 110 having the maintenance system 112, a maintenance database 120, the application server 116, and the communication network 118.

The maintenance database 120 may include suitable logic, circuitry, interfaces, and/or code, executable by the circuitry, that may be configured to store the first maintenance data associated with the plurality of vehicles 102-108. The maintenance database 120 may receive the first maintenance data from the maintenance system 112. The maintenance database 120 may receive the first maintenance data periodically or in real-time or near real-time. The maintenance database 120 may be configured to communicate with the maintenance system 112 via the communication network 118.

In another embodiment, instead of the database server 114 (as shown in FIG. 1A), the application server 116 may be configured to collect the first maintenance data, the first booking data, the first vehicle data and the first driver behavioral data, over the first time-interval, from each of the plurality of vehicles 102-108 and the maintenance database 120. The first time-interval may be one week, 30 days, 60 days, 100 days, 360 days, or the like.

FIG. 2A is a block diagram that illustrates an exemplary scenario 200A for training a classifier for determining driver scores for vehicle drivers, in accordance with an exemplary embodiment of the disclosure. The application server 116 may include a memory 202, a network interface 204, a processing circuitry 206, a machine learning engine 208, and the classifier (hereinafter, referred to and designated as the classifier 210").

The memory 202 may include suitable logic, circuitry, and interfaces that may be configured to store one or more instructions which when executed by the processing circuitry 206 cause the processing circuitry 206 to perform various operations for determining driver scores for vehicle drivers. The memory 202 may be configured to store the first maintenance data, the first booking data and the first vehicle data associated with the plurality of vehicles 102-108, and the first driver behavioral data associated with the plurality of drivers A-D. The memory 202 may be accessible by the processing circuitry 206, the machine learning engine 208, and the classifier 210. Examples of the memory 202 may include, but are not limited to, a random-access memory (RAM), a read only memory (ROM), a removable storage drive, a hard disk drive (HDD), a flash memory, a solid-state memory, or the like. It will be apparent to a person skilled in the art that the scope of the disclosure is not limited to realizing the memory 202 in the application server 116, as described herein. In another embodiment, the memory 202 may be realized in the form of a database or a cloud storage working in conjunction with the application server 116, without departing from the scope of the disclosure.

The network interface 204 may include suitable logic, circuitry, interfaces, and/or code, executable by the circuitry, that may be configured to enable the application server 116 to communicate with the database server 114, the maintenance database 120 (shown in FIG. 1B), and driver devices (for example, a driver device 212 associated with the vehicle 102) of each of the plurality of vehicles 102-108. The network interface 204 may be implemented as a hardware, software, firmware, or a combination thereof. Examples of the network interface 204 may include a network interface card, a physical port, a network interface device, an antenna, a radio frequency transceiver, a wireless transceiver, an Ethernet port, a universal serial bus (USB) port, or the like.

The processing circuitry 206 may include suitable logic, circuitry, interfaces, and/or code, executable by the circuitry, that may be configured to execute the instructions stored in the memory 202 to perform various operations for determining driver scores for vehicle drivers. The processing circuitry 206 may be configured to perform various operations associated with data collection and data processing. The processing circuitry 206 may be implemented by one or more processors, such as, but not limited to, an application-specific integrated circuit (ASIC) processor, a reduced instruction set computing (RISC) processor, a complex instruction set computing (CISC) processor, and a field-programmable gate array (FPGA) processor. The one or more processors may also correspond to central processing units (CPUs), graphics processing units (GPUs), network processing units (NPUs), digital signal processors (DSPs), or the like. It will be apparent to a person of ordinary skill in the art that the processing circuitry 206 may be compatible with multiple operating systems.

When the application server 116 is operating in the training mode, the processing circuitry 206 may be configured to receive, from the database server 114, the first maintenance data, the first booking data, and the first vehicle data associated with the plurality of vehicles 102-108, and the first driver behavioral data associated with the plurality of drivers A-D of the respective vehicles 102-108. The processing circuitry 206 may be further configured to store the received first maintenance data, the first booking data, the first vehicle data, and the first driver behavioral data in the memory 202 or a cloud database server (not shown).

In one embodiment, the database server 114 is configured to collect the first maintenance data, the first booking data, the first vehicle data, and the first driver behavioral data over the first time-interval from the driver device of each of the plurality of vehicles 102-108, the maintenance system 112, or the maintenance database 120.

In another embodiment, the processing circuitry 206 may be configured to collect the first maintenance data, the first booking data, the first vehicle data, and the first driver behavioral data over the first time-interval from the driver device of each of the plurality of vehicles 102-108, the maintenance system 112, or the maintenance database 120. In one example, the driver device of each of the plurality of vehicles 102-108 may correspond to a telematics device (not shown) or an on-board diagnostic (OBD) device (not shown). The processing circuitry 206 may be further configured to store the collected first maintenance data, the first booking data, the first vehicle data, and the first driver behavioral data in the memory 202 or the cloud database server. The processing circuitry 206 may be further configured to cause the machine learning engine 208 to analyze and process the collected first maintenance data, the first booking data, the first vehicle data, and the first driver behavioral data, and obtain the plurality of features (hereinafter, referred to and designated as the plurality of features 214").

The machine learning engine 208 may include suitable logic, circuitry, interfaces, and/or code, executable by the circuitry, that may be configured to perform one or more operations for determining driver scores for vehicle drivers. Examples of the machine learning engine 208 may include, but are not limited to, an ASIC processor, a RISC processor, a CISC processor, and an FPGA processor. The machine learning engine 208 may also correspond to a CPU, a GPU, an NPU, a DSP, or the like. It will be apparent to a person of ordinary skill in the art that the machine learning engine 208 may be compatible with multiple operating systems. Further, the machine learning engine 208 may include a machine-learning model that implements any suitable machine-learning techniques, statistical techniques, or probabilistic techniques for performing the one or more operations associated with the training of the classifier 210.

When the application server 116 is operating in the training mode, the machine learning engine 208 may be configured to retrieve the first maintenance data, the first booking data, the first vehicle data, and the first driver behavioral data stored in the memory 202. The collection of the first maintenance data, the first booking data, the first vehicle data, and the first driver behavioral data has been described in the foregoing description of FIGS. 1A and 1B. Further, the machine learning engine 208 may use various feature or variable selection techniques to analyze the first maintenance data, the first booking data, the first vehicle data, and the first driver behavioral data, and obtain the plurality of features 214 that are direct or indirect indicators of driver performance based on the first maintenance data, the first booking data, the first vehicle data, and the first driver behavioral data. For example, the machine learning engine 208 may determine that a count of accidents caused by a driver is an indicator of whether the driver is good or bad.

The plurality of features 214 obtained by the machine learning engine 208 may include the count of negligence incidents of each of the plurality of drivers A-D, the total repair and maintenance cost incurred by each of the plurality of drivers A-D, the overall cost incurred due to accidents of the plurality of vehicles 102-108 caused by the corresponding plurality of drivers A-D, the repair count of each of the plurality of vehicles 102-108, the count of breakdowns of each of the plurality of vehicles 102-108, the count of unscheduled maintenance requested by each of the plurality of drivers A-D, and the cost per unit distance incurred for one or more components of each of the plurality of vehicles 102-108 by each of the plurality of drivers A-D. The one or more components may include, but are not limited to, brakes, clutch, suspension, external parts of each of the plurality of vehicles 102-108, batteries, alternators, exhaust fuel pipes, engine, tires, cooling system, lubrication system, steering wheel, or the like.

The count of negligence incidents of each of the plurality of drivers A-D is an indicator of carefulness of the plurality of drivers A-D towards a health status of their respective vehicles 102-108. For example, a high count of negligence incidents of the driver B is an indicator of a careless attitude of the driver B towards the corresponding vehicle 104.

The total repair and maintenance cost incurred by each of the plurality of drivers A-D is indicative of a cost borne by the transportation service provider due to damages caused to the plurality of vehicles 102-108. A high total repair and maintenance cost indicates that the plurality of drivers A-D have been causing loss to the corresponding transportation service provider. For example, a high repair and maintenance cost of the vehicle 104 may indicate that the driver B has been careless with regard to driving ethics and safekeeping of the vehicle 104.

The overall cost incurred due to accidents caused by each of the plurality of drivers A-D is an indicator of sincerity or recklessness of the plurality of drivers A-D while driving the respective vehicles 102-108. For example, a low overall cost incurred due to accidents caused by the driver B may indicate that the driver B has been careful and attentive while driving the vehicle 104.

The repair count of each of the plurality of vehicles 102-108 is indicative of a frequency of damages caused to the plurality of vehicles 102-108. For example, a high repair count of the vehicle 104 indicates that the vehicle 104 is damaged more frequently as compared to another vehicle having a low repair count. Thus, the repair count indicates an attitude of the plurality of drivers A-D towards the respective vehicles 102-108.

The count of breakdowns of each of the plurality of vehicles 102-108 is indicative of a frequency of breakdowns suffered by the plurality of vehicles 102-108. The breakdowns may have caused damages to the plurality of vehicles 102-108, inconvenience to one or more passengers travelling via the plurality of vehicles 102-108, and loss to the transportation service provider. For example, a low count of breakdowns of the vehicle 104 may indicate that the driver B has been professional and sincere towards the vehicle 104 in terms of driving and maintenance.

The count of unscheduled maintenance requested by each of the plurality of drivers A-D is indicative of a number of times each of the plurality of drivers A-D have damaged the respective vehicles 102-108 to an extent that it had to be repaired immediately. The count of unscheduled maintenance requested by each of the plurality of drivers A-D also indicates that the plurality of drivers A-D may have missed one or more scheduled maintenance appointments.

In one example, an unscheduled maintenance appointment may be requested by the driver A of the vehicle 102. The driver A may have a good record of timeliness of the scheduled maintenance. Therefore, such request for unscheduled maintenance may indicate that the driver A is not attentive towards the vehicle 102 while on the driving and thus leading to numerous damages and breakdowns of the vehicle 102.

The cost per unit distance incurred for one or more components of each of the plurality of vehicles 102-108 by each of the plurality of drivers A-D indicates a cost that is borne by the transportation service provider by employing the plurality of drivers A-D to drive the plurality of vehicles 102-108. For example, a high cost per unit distance incurred for one or more components of the vehicle B may indicate that the driver B is causing loss to the transportation service provider while driving the vehicle 104.

The plurality of features 214 obtained by the machine learning engine 208 may further include lean and peak booking hours of each of the plurality of vehicles 102-108, the average count of bookings per day for each of the plurality of vehicles 102-108, the monthly earning of each of the plurality of drivers A-D, and the distance driven per day by each of the plurality of drivers A-D. The lean booking hours refer to driving hours of the plurality of vehicles 102-108 during which a minimum number of bookings is received by the respective drivers A-D. The peak booking hours refer to driving hours of the plurality of vehicles 102-108 during which a maximum number of bookings is received by the respective drivers A-D. In an example, the average count of bookings per day for each of the plurality of vehicles 102-108 may be determined by dividing a count of bookings received by each of the plurality of vehicles 102-108 in the month by a number of days in the month. The distance driven per day may include the dry run distance driven by each of the plurality of drivers A and D, the trip distance driven by each of the plurality of drivers A-D, and the excess distance driven by each of the plurality of drivers A-D. The dry run distance refers to a distance driven by each of the plurality of drivers A-D without having a booking. The trip distance refers to a distance driven by each of the plurality of drivers A-D for completing a booking. The excess distance refers to distance driven by each of the plurality of drivers A-D without any information to the transportation service provider.

The plurality of features 214 obtained by the machine learning engine 208 may further include the tenure of each of the plurality of drivers A-D, the make of each of the plurality of vehicles 102-108, the vehicle model of each of the plurality of vehicles 102-108, the region of operation of each of the plurality of vehicles 102-108, the odometer reading of each of the plurality of vehicles 102-108, and the age of each of the plurality of vehicles 102-108. By taking into account, the make of each of the plurality of vehicles 102-108, the vehicle model of each of the plurality of vehicles 102-108, and the region of operation of each of the plurality of vehicles 102-108, the machine learning engine 208 ensures that the classifier 210 training is normalized based on various actions of the plurality of drivers A-D and not based on inherent faults of their respective vehicles 102-108.

The plurality of features 214 obtained by the machine learning engine 208 may further include the count of accidents of the plurality of vehicles 102-108 caused by the corresponding plurality of drivers A-D, the timeliness of scheduled maintenances of each of the plurality of vehicles 102-108, and the count of counterfeit incidents caused by each of the plurality of drivers A-D. A lack of timeliness in attending scheduled maintenance appointments may indicate that each of the plurality of drivers A-D is not serious about timely maintenance and well-being of the corresponding vehicle 102-108. The counterfeit incidents refer to situations when original components of the plurality of vehicles 102-108 are replaced with duplicates or counterfeit components by the respective plurality of drivers A-D. In an example, maintenance and repair data of the vehicle 104 may indicate that "5" counterfeit incidents have been caused by the driver B. In other words, original parts of the vehicle 104 have been replaced with duplicate parts by the driver B at "5" occasions. Such counterfeit incidents may reduce the life-span of each of the plurality of vehicles 102-108 and also cause financial loss to the transportation service provider. The count of counterfeit incidents caused by each of the plurality of drivers A-D may further indicate honest or dishonest nature of each of the plurality of drivers A-D. For example, a high count of counterfeit incidents caused by the driver B may indicate that the driver B is dishonest and has been committing fraud and causing loss to the transportation service provider.

The machine learning engine 208 may be further configured to obtain the plurality of feature values (hereinafter, referred to and designated as the plurality of features values 216") corresponding to the plurality of features 214 based on the first maintenance data, the first booking data, the first vehicle data, and the first driver behavioral data stored in the memory 202. The plurality of feature values 216 may include the plurality of moving average values, the plurality of moving standard deviation values, and the plurality of cumulative sum values. The plurality of feature values 216 provide a historical pattern of behavior of each of the plurality of drivers A-D. The plurality of moving average values, the plurality of moving standard deviation values, and the plurality of cumulative sum values are obtained for each of the plurality of features 214. For example, a count of negligence incidents caused by the driver B of the vehicle 104 over a week may include values x1, x2, x3, x4, x5, x6, and x7. Thus, the machine learning engine 208 may obtain the moving average value for day 1 based on moving average (x1), moving average value for day 2 based on moving average (x1, x2), and moving average value for day 3 based on moving average (x1, x2, x3). Similarly, moving average values for each of day 4 to day 7 are obtained based on moving average across count of negligence incidents of previous days and current day. Similarly, the machine learning engine 208 may obtain the moving standard deviation value for day 1 based on standard deviation (x1), moving standard deviation value for day 2 based on standard deviation (x1, x2), and moving standard deviation value for day 3 based on standard deviation (x1, x2, x3). Similarly, the plurality of moving average values, the plurality of moving standard deviation values, and the plurality of cumulative sum values are obtained for each of the plurality of features 214 for each of the plurality of drivers A-D. It will be apparent to a person of ordinary skill in the art that the plurality of feature values 216 is not limited to include the plurality of moving average values, the plurality of moving standard deviation values, and the plurality of cumulative sum values. In another embodiment, the plurality of feature values 216 may include other statistical parameters such as rolling mean values or the like.

In one embodiment, each feature of the plurality of features 214 may be assigned a weight corresponding to a strength of a relationship of correlation between the feature and the behavior of each of the plurality of drivers A-D. For example, a first feature (e.g., count of counterfeit incidents) may be assigned a higher weight than a second feature (e.g., average count of bookings per day), based on determination by the machine learning engine 208 that the moving standard deviation of the count of counterfeit incidents is a better predictor of driver performance than the moving average of the average count of bookings per day. It will be apparent to a person of ordinary skill in the art that the abovementioned plurality of features 214 and the plurality of feature values 216 are for exemplary purpose and should not be construed as limitations to the scope of the disclosure.

The machine learning engine 208 may be further configured to segregate the plurality of feature values 216 into the plurality of clusters 218. The machine learning engine 208 may segregate the plurality of feature values 216 into the plurality of clusters 218 based on one or more clustering algorithms such as a density-based clustering approach (such as, Density-based spatial clustering of applications with noise i.e., DB scan), K-means clustering algorithm, agglomerative hierarchical clustering algorithm, or the like. Clustering of data into multiple clusters is a known practice and will be known to those of ordinary skill in the art. For example, those feature values in the plurality of feature values 216 that exhibit a good driver performance may be segregated into a first cluster and those feature values in the plurality of feature values that exhibit a bad (or substandard) driver performance may be segregated into a second cluster. A count of clusters obtained by the machine learning engine 208 is based on a variance observed in the plurality of feature values 216. The machine learning engine 208 may be further configured to label the plurality of clusters 218, for example, the first cluster may be labeled as a good driver cluster and the second cluster may be labeled as a bad (or substandard) driver cluster.

The machine learning engine 208 may be configured to train the classifier 210 based on the plurality of clusters 218. For example, the machine learning engine 208 may input the plurality of clusters 218 to the classifier 210 and the classifier 210 may correlate each cluster with the feature values in the corresponding cluster. In the current embodiment, for the sake of brevity, training data (i.e., the plurality of clusters 218) has been shown to correspond to a sample size of four (i.e., four vehicles 102-108). However, in an actual implementation, the training data may correspond to a large sample size (e.g., a sample size of a thousand vehicles, ten thousand vehicles, or a million vehicles). The machine learning engine 208 may train the classifier 210 using one or more classification algorithms such as logistic regression classification algorithm, or the like. Examples of the classifier 210 may include but are not limited to, a Support Vector Machine (SVM), a Logistic Regression, a Bayesian Classifier, a Decision Tree Classifier, a Copula-based Classifier, a K-Nearest Neighbors (KNN) Classifier, or a Random Forest (RF) Classifier, a deep learning based classifier, or a neural network based classifier. Upon training, the classifier 210 may be configured to distinguish between good driver performance and bad driver performance based on maintenance data, booking data, and vehicle data associated with any vehicle, and driver behavioral data of a corresponding driver.

The machine learning engine 208 may be further configured to validate an accuracy level of the trained classifier 210. For example, the machine learning engine 208 may provide maintenance data, booking data, and vehicle data associated with a test vehicle, and driver behavioral data of a test driver of the test vehicle as input the trained classifier 210. The test driver may have been identified to be a bad (or substandard) driver by the transportation service provider in the past. As an output, the trained classifier 210 may classify the test driver in one the good driver cluster or the bad (or substandard) driver cluster and output a probability score for the classification. The machine learning engine 208 may be configured to compare the output of the trained classifier 210 with actual result and generate a validation output, i.e., the machine learning engine 208 may check whether the trained classifier 210 has classified the test driver in the bad driver cluster. The validation output may be used as a feedback to improve the accuracy level of the trained classifier 210.

Figure 2B:
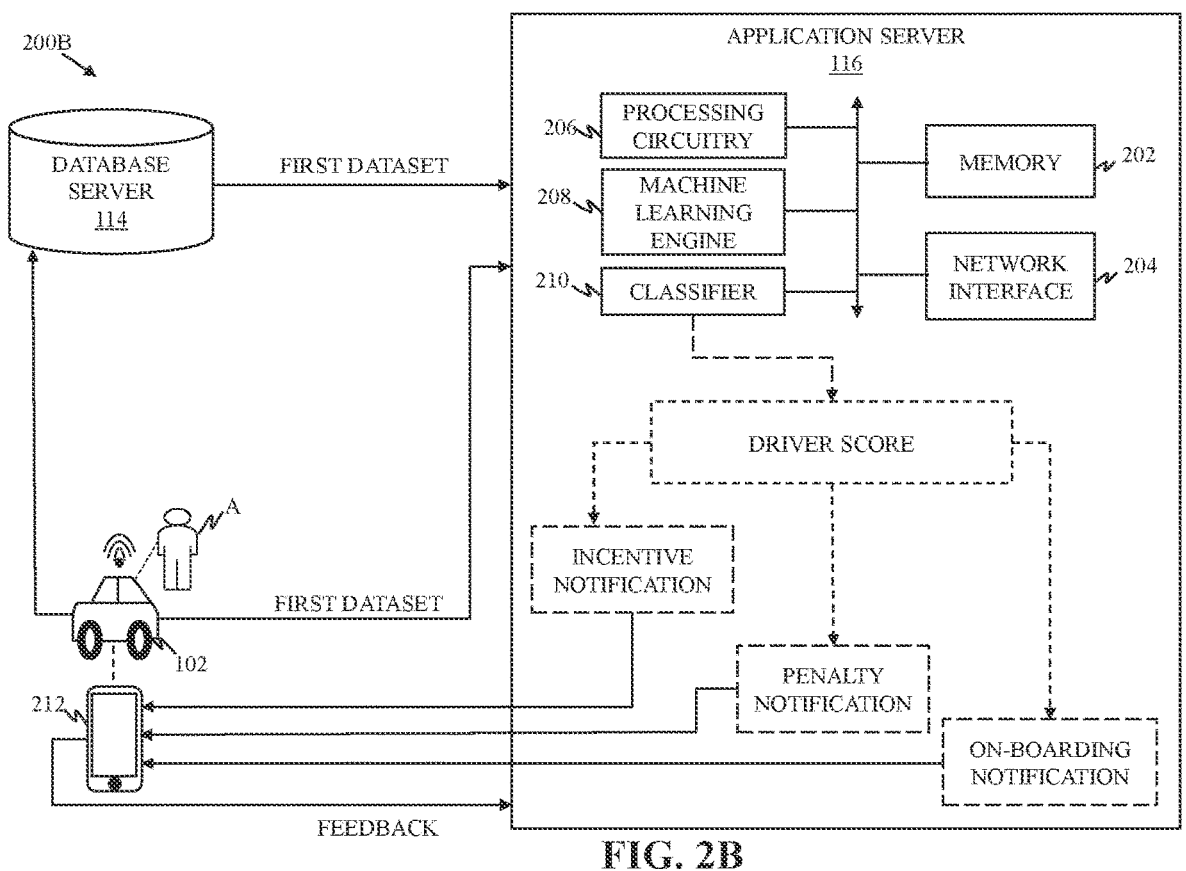
FIG. 2B is a schematic diagram that illustrates an exemplary scenario for determining a driver score for a driver of a vehicle, in accordance with an exemplary embodiment of the disclosure.

FIG. 2B is a schematic diagram that illustrates an exemplary scenario 200B for determining a driver score for a driver of a vehicle, in accordance with an exemplary embodiment of the disclosure. The application server 116 may include the memory 202, the network interface 204, the processing circuitry 206, the machine learning engine 208, and the trained classifier 210. For the sake of brevity, the implementation mode of the application server 116 is explained with respect to the driver A and the vehicle 102. However, the application server 116 may utilize the trained classifier 210 to determine the driver score for a driver of any vehicle irrespective of make, model, age, or the like of the vehicle.

In the implementation mode, the application server 116 may be configured to receive, from the database server 114, the first dataset associated with the vehicle 102 and the driver A. The application server 116 may be configured to receive at least a portion of the first dataset from the driver device 212 associated with the vehicle 102. The first dataset may include the second maintenance data, the second booking data, and the second vehicle data associated with the vehicle 102, and the second driver behavioral data of the driver A. In an example, the application server 116 may receive the second booking data from the driver device 212. In one embodiment, the first dataset may be associated with an entire tenure (for example, from date of joining to present day) of the driver A with the transportation service provider. In another embodiment, the first dataset may be associated with a specified tenure duration (for example, past one month, past 6 months, past one year, or the like) of the driver A with the transportation service provider. In one embodiment, the first dataset may be provided as input to the trained classifier 210. In another embodiment, a new plurality of feature values for the plurality of features 214 may be obtained based on the first dataset such that the new plurality of feature values are provided as input to the trained classifier 210. In one embodiment, the processing circuitry 206 may be configured to obtain the new plurality of feature values based on the first dataset. In another embodiment, the machine learning engine 208 may be configured to obtain the new plurality of feature values based on the first dataset.

As an output to the inputted first dataset, the trained classifier 210 may be configured to associate the driver A with one of the plurality of clusters 218, for example, the good driver cluster or the bad driver cluster, based on the first dataset or the new plurality of feature values. The trained classifier 210 may be further configured to output a probability or a likelihood score for associating the driver A with one of the plurality of clusters 218. The processing circuitry 206 may be configured to determine the driver score for the driver A based on the output of the trained classifier 210. In one example, the driver score corresponds to a likelihood or a probability score of a driver being associated with one of the plurality of clusters 218. For example, the trained classifier 210 may classify the driver A into the good driver cluster with a probability score of 90%. In such a scenario, the processing circuitry 206 may determine that the driver score for the driver A is 90. In another example, the trained classifier 210 may classify the driver A into the bad driver cluster with a probability of 60%. In such a scenario, the processing circuitry 206 may determine that the driver score for the driver A is 40 (i.e., 100−60=40).

In an embodiment, the processing circuitry 206 may be configured to receive a feedback from the driver A in the form of a voice feedback, a text feedback, or a signal feedback in response to an issue associated with the vehicle 102. For example, an unscheduled maintenance appointment may be requested by the driver A for servicing a battery of the vehicle 102. Further, a feedback may be provided by the driver A using the driver device 212 to indicate that excessive discharge from the battery is due to increased usage of air conditioning system. Further, it may be specified in the feedback that the increased use of air conditioning system is due to an increased temperature in the region of operation of the vehicle 102. In such a scenario, the early or unscheduled maintenance of the battery of the vehicle 102 due to excessive discharge may not negatively affect the driver score of the driver 102.

The processing circuitry 206 may be further configured to select one of the plurality of outcomes for the driver A based on the driver score of the driver A. In other words, the processing circuitry 206 may select the outcome based on the output of the trained classifier 210. The plurality of outcomes may include onboarding of the first driver onto a transportation service platform associated with the application server 116, incentivizing the driver A, penalizing the driver A, accepting the maintenance request of the driver A, and rejecting the maintenance request of the driver A. In an example, the processing circuitry 206 may select to reject the maintenance request of the driver A based on a driver score "20" of the driver A. In another example, the processing circuitry 206 may select to penalize the driver A based on a low driver score "30". In an example, the processing circuitry 206 may select to off-board the driver A based on a very low driver score "10".

In an embodiment, the processing circuitry 206 may be configured to generate a notification based on the selected outcome for the driver A and the network interface 204 may be configured to communicate the notification to the driver device 212. For example, the processing circuitry 206 may generate an incentive notification to be communicated to the driver device 212 for incentivizing the driver A due to a high driver score. In another example, the processing circuitry 206 may generate a penalty notification to be communicated to the driver device 212 for penalizing the driver A due to a low driver score. In another example, the processing circuitry 206 may generate an off-boarding notification to be communicated to the driver device 212 for off-boarding the driver A from the transportation service platform due a very low driver score. In another example, the processing circuitry 206 may generate an on-boarding notification to be communicated to the driver device 212 for on-boarding the driver A to the transportation service platform due to a consistent high driver score for over a second time-interval.

In an embodiment, the processing circuitry 206 may be further configured to interpret the output of the trained classifier 210 to determine one or more dominating features among the plurality of features 214 that resulted in the determined driver score. The application server 116 may interpret the output of the trained classifier 210 based on one or more interpretation algorithms. Example of the one or more interpretation algorithm includes, but are not limited to, Local interpretable model-agnostic explanations (LIME) and SHapley Additive exPlanations (SHAP). For example, based on a very low driver score of the driver A, the processing circuitry 206 may identify that the low driver score of the driver A is because of repeated accidents caused by the driver A, missing scheduled maintenance appointments, and a very high count of unscheduled maintenance requests. Such analysis may enable the transportation service provider to issue targeted warnings or notifications to the driver A through the driver device 212.

In an embodiment, the trained classifier 210 may be further configured to determine a pattern of change in performance of the driver A. In one exemplary scenario, the classifier 210 may segregate the first dataset into multiple subsets as per a chronological order observed in the first dataset. Each subset may correspond to a specific time duration, such as one month. For example, the first dataset may include the second maintenance data, the second booking data, the second vehicle data, and the second driver behavioral data collected for the driver A for a duration of April-July. In such a scenario, the classifier 210 may segregate the first dataset into first through fourth subsets such that the first through fourth subsets correspond to performance of the driver A in the months of April through July, respectively. The classifier 210 may then classify the driver A into one of the plurality of clusters 218 for each subset and the processing circuitry 206 may determine the driver score for the driver A based on the output of the classifier 210 for each subset. The processing circuitry 206 may be further configured to determine the pattern of change in the performance of the driver A from April to July. For example, if the driver score for April is highest and the driver score for July is lowest, the processing circuitry 206 may be configured to raise a flag for the transportation service provider to indicate the deteriorating performance of the driver A. Further, the processing circuitry 206 may penalize the driver A for bad performance. Further, the pattern of change may also be indicative of a recent change in behavior and attitude of the driver A towards the vehicle 102. In an example, the driver A may have a tenure of two years with transportation service provider and the driver score of the driver A may have started declining for the past three months. In such a scenario, the decline in the driver score of the driver A is indicative of a negative change in the behavior and attitude of the driver A towards the vehicle 102 and the transportation service provider.

Figure 3:
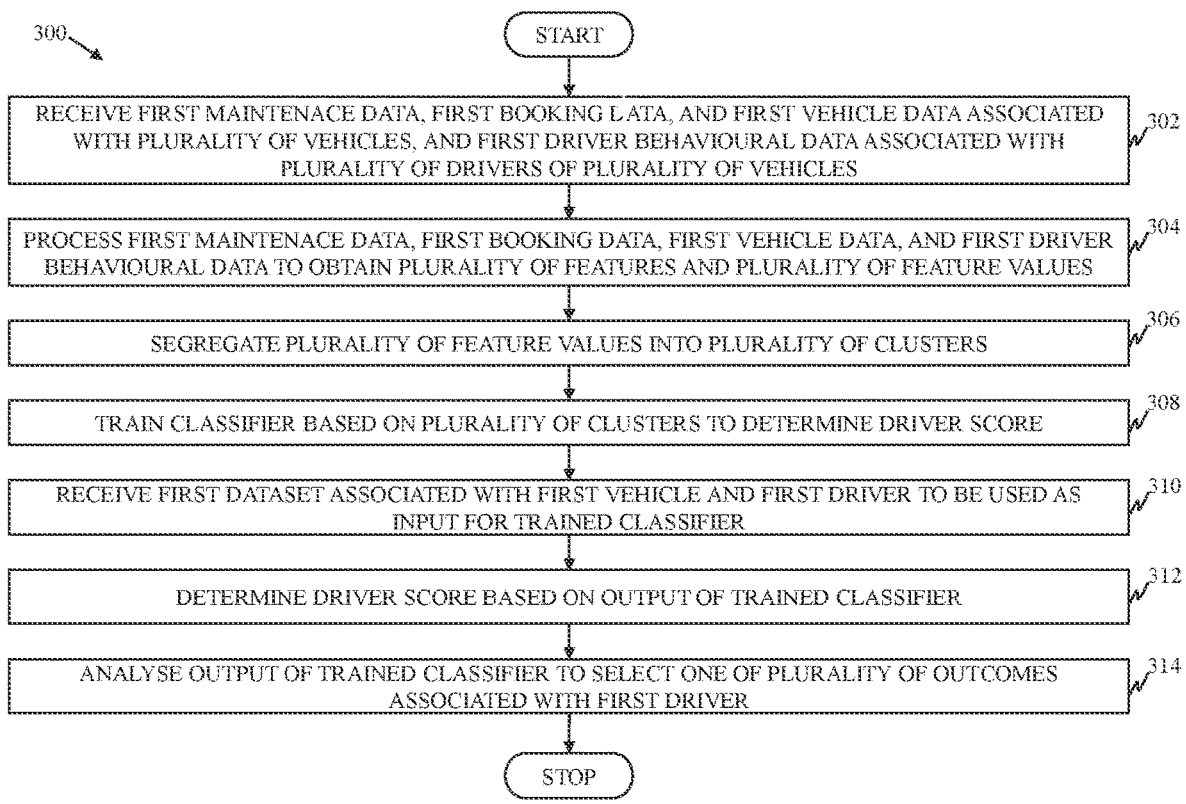
FIG. 3 is a flow chart that illustrates a method for determining a driver score for a driver of a vehicle, in accordance with an exemplary embodiment of the disclosure.

FIG. 3 is a flow chart 300 that illustrates a method for determining a driver score for a driver of a vehicle, in accordance with an exemplary embodiment of the disclosure.

At 302, the first maintenance data, the first booking data, and the first vehicle data associated with the plurality of vehicles 102-108, and the first driver behavioral data for the plurality of drivers A-D of the plurality of vehicles 102-108 are received. The application server 116 may be configured to receive, from the database server 114, the first maintenance data, the first booking data, and the first vehicle data associated with the plurality of vehicles 102-108, and the first driver behavioral data for the plurality of drivers A-D of the plurality of vehicles 102-108. In an embodiment, the database server 114 may have collected the first maintenance data, the first booking data, the first vehicle data, and the first driver behavioral data from one of the maintenance database 120, each of the plurality of vehicles 102-108, and the transportation service provider over the first time-interval.

At 304, the plurality of features 214 and the plurality of feature values 216 corresponding to the plurality of features 214 are obtained based on the first maintenance data, the first booking data, the first vehicle data, and the first driver behavioral data. The application server 116 may be configured to obtain the plurality of features 214 and the plurality of feature values 216 corresponding to the plurality of features 214 based on the first maintenance data, the first booking data, the first vehicle data, and the first driver behavioral data. The plurality of features 214 are indicators of driver performance and include at least the repair and maintenance cost incurred by each of the plurality of drivers A-D.

The plurality of features 214 may further include the cost per unit distance incurred by each of the plurality of drivers A-D for one or more components of each of the plurality of vehicles 102-108, and the count of counterfeit incidents caused by each of the plurality of drivers A-D, the overall cost incurred due to one or more accidents of the plurality of vehicles 102-108 caused by each of the corresponding plurality of drivers A-D, the repair count of each of the plurality of vehicles 102-108, the count of breakdowns of each of the plurality of vehicles 102-108, and the count of unscheduled maintenance requested by each of the plurality of drivers A-D. The plurality of features 214 may further include the monthly earning of each of the plurality of drivers A-D, and lean and peak booking hours of each of the plurality of vehicles 102-108, the average count of bookings per day for each of the plurality of vehicles 102-108, and the distance driven per day by each of the plurality of drivers A-D. The distance driven per day includes the dry run distance driven by each of the plurality of drivers A-D, the trip distance driven by each of the plurality of drivers A-D, and the excess distance driven by each of the plurality of drivers A-D. The plurality of features 214 may further include the tenure of each of the plurality of drivers A-D, the make of each of the plurality of vehicles 102-108, the vehicle model of each of the plurality of vehicles 102-108, the region of operation of each of the plurality of vehicles 102-108, the odometer reading of each of the plurality of vehicles 102-108, and the age of each of the plurality of vehicles 102-108. The plurality of features 214 may further include the count of accidents of the plurality of vehicles 102-108 caused by each of the corresponding plurality of drivers A-D, the timeliness of scheduled maintenances of each of the plurality of vehicles 102-108, and the count of negligence incidents caused by each of the plurality of drivers A-D. The plurality of feature values 216 may include the plurality of moving average values, the plurality of moving standard deviation values, and the plurality of cumulative sum values.

At 306, the plurality of feature values 216 are segregated into the plurality of clusters 218. The application server 116 may be configured to segregate the plurality of feature values 216 into the plurality of clusters 218.

At 308, the classifier 210 is trained based on the plurality of clusters 218 to determine the driver score. The application server 116 may be configured to train the classifier 210 based on the plurality of clusters 218 to determine the driver score.

At 310, the first dataset associated with the first vehicle (e.g., the vehicle 102) and the first driver (e.g., the driver A) is received. The application server 116 may be configured to receive, from the database server 114, the first dataset associated with the first vehicle and the first driver. The first dataset includes the second maintenance data, the second booking data, and the second vehicle data associated with the first vehicle, and the second driver behavioral data for the first driver. In an embodiment, the database server 114 may have collected the first dataset from one of the maintenance database 120, the transportation service provider, and the first vehicle over the second time-interval.

At 312, the first dataset is provided as input to the trained classifier 210. The application server 116 may be configured to provide the received first dataset as input to the trained classifier 210. At 314, the driver score for the first driver is determined based on the output of the trained classifier 210. The application server 116 may be configured to determine the driver score of the first driver of the first vehicle based on the output of the trained classifier 210. The output of the trained classifier 210 is based on the inputted first dataset.

At 316, one of the plurality of outcomes is selected for the first driver based on the determined driver score. The application server 116 may be configured to select one of the plurality of outcomes for the first driver based on the determined driver score. The plurality of outcomes may include onboarding of the first driver onto the transportation service platform associated with the application server 116, incentivizing the first driver, penalizing the first driver, accepting the maintenance request of the first driver, and rejecting the maintenance request of the first driver.

In an example, the transportation service provider may be a car rental platform. The car rental platform may allow users to register themselves with the car rental platform to rent one or more cars from the car rental platform. The car rental platform may determine, based on a driver score of a specific user, to accept or reject a rental request of the user for renting one or more cars from the car rental platform.

Figure 4:
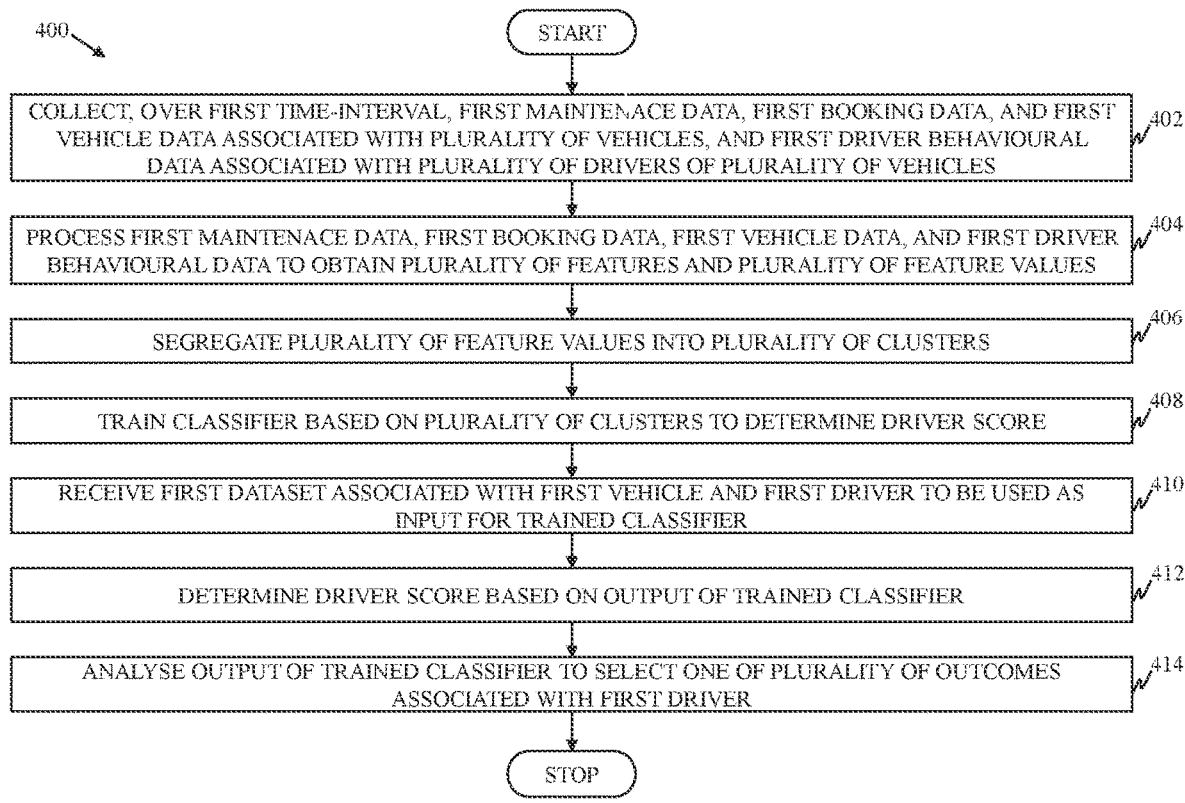
FIG. 4 is a flow chart that illustrates another method for determining a driver score for a driver of a vehicle, in accordance with an exemplary embodiment of the disclosure.

FIG. 4 is a flow chart 400 that illustrates a method for determining the driver score for a driver of a vehicle, in accordance with an exemplary embodiment of the disclosure.

At step 402, the first maintenance data, the first booking data, the first vehicle data associated with the plurality of vehicles 102-108, and the first behavioral data associated with the plurality of drivers A-D are collected, over the first time-interval. The application server 116 may be configured to collect the first maintenance data, the first booking data, the first vehicle data, and the first driver behavioral data from one of the maintenance database 120, the telematics device each of the plurality of vehicles 102-108, and the transportation service provider.

At 404, the plurality of features 214 and the plurality of feature values 216 corresponding to the plurality of features 214 are obtained based on the first maintenance data, the first booking data, the first vehicle data, and the first driver behavioral data. The application server 116 may be configured to obtain the plurality of features 214 and the plurality of feature values 216 corresponding to the plurality of features 214. The plurality of features 214 are indicators of driver performance and include at least the repair and maintenance cost incurred by each of the plurality of drivers A-D.

At 406, the plurality of feature values 216 are segregated into the plurality of clusters 218. The application server 116 may be configured to segregate the plurality of feature values 216 into the plurality of clusters 218.

At 408, the classifier 210 is trained based on the plurality of clusters 218 to determine the driver score. The application server 116 may be configured to train the classifier 210 based on the plurality of clusters 218 to determine the driver score.

At 410, the first dataset associated with the first vehicle (e.g., the vehicle 102) and the first driver (e.g., the driver A) is received. Further, at least a portion of the first dataset is received from the driver device (e.g., the driver device 212) associated with the first vehicle. The application server 116 may be configured to receive, from the database server 114, the first dataset associated with the first vehicle and the first driver. The first dataset may include the second maintenance data, the second booking data, and the second vehicle data associated with the first vehicle, and the second driver behavioral data for the first driver. In an embodiment, the application server 116 may be configured to collect the first dataset from one of the maintenance database 120, the transportation service provider, and each of the plurality of vehicles 102-108.

At 412, the first dataset may be provided as the input to the trained classifier 210. The application server 116 may be configured to provide the first dataset as the input to the trained classifier 210. At 414, the driver score for the first driver is determined based on the output of the trained classifier 210. The application server 116 may be configured to determine the driver score of the first driver of the first vehicle based on the output of the trained classifier 210. The output of the trained classifier 210 is based on the inputted first dataset.

At 416, one of the plurality of outcomes is selected for the first driver based on the determined driver score. The application server 116 may be configured select one of the plurality of outcomes for the first driver based on the determined driver score. The plurality of outcomes may include onboarding of the first driver with the transportation service provider associated with the application server 116, incentivizing the first driver, penalizing the first driver, accepting the maintenance request of the first driver, and rejecting the maintenance request of the first driver.

Figure 5:
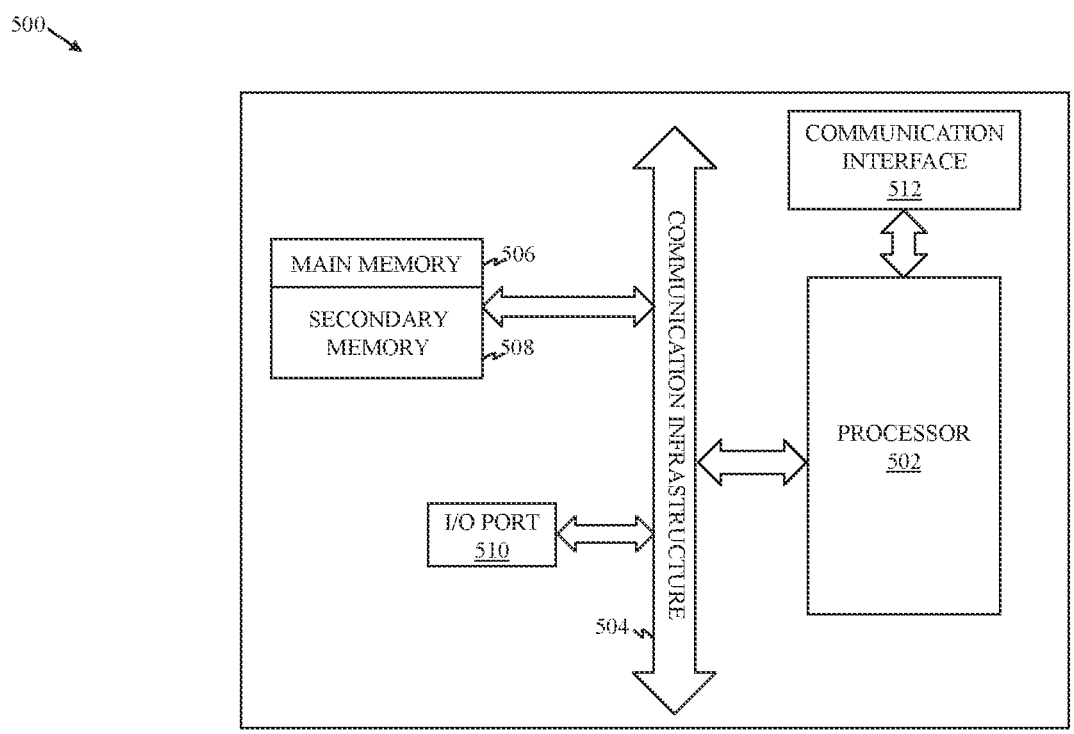
FIG. 5 is a block diagram that illustrates a system architecture of a computer system for determining a driver score for a driver of a vehicle, in accordance with an exemplary embodiment of the disclosure.

FIG. 5 is a block diagram that illustrates a system architecture of a computer system for determining the driver score for a driver of a vehicle, in accordance with an exemplary embodiment of the disclosure. An embodiment of the disclosure, or portions thereof, may be implemented as computer readable code on the computer system 500. In one example, the maintenance system 112, the database server 114, the application server 116, or the maintenance database 120 of FIG. 1A or 1B may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

The computer system 500 may include a processor 502 that may be a special purpose or a general-purpose processing device. The processor 502 may be a single processor or multiple processors. The processor 502 may have one or more processor "cores." Further, the processor 502 may be coupled to a communication infrastructure 504, such as a bus, a bridge, a message queue, the communication network 118, multi-core message-passing scheme, or the like. The computer system 500 may further include a main memory 506 and a secondary memory 508. Examples of the main memory 506 may include RAM, ROM, and the like. The secondary memory 508 may include a hard disk drive or a removable storage drive (not shown), such as a floppy disk drive, a magnetic tape drive, a compact disc, an optical disk drive, a flash memory, or the like. Further, the removable storage drive may read from and/or write to a removable storage device in a manner known in the art. In an embodiment, the removable storage unit may be a non-transitory computer readable recording media.

The computer system 500 may further include an input/output (I/O) port 510 and a communication interface 512. The I/O port 510 may include various input and output devices that are configured to communicate with the processor 502. Examples of the input devices may include a keyboard, a mouse, a joystick, a touchscreen, a microphone, and the like. Examples of the output devices may include a display screen, a speaker, headphones, and the like. The communication interface 512 may be configured to allow data to be transferred between the computer system 500 and various devices that are communicatively coupled to the computer system 500. Examples of the communication interface 512 may include a modem, a network interface, i.e., an Ethernet card, a communication port, and the like. Data transferred via the communication interface 512 may be signals, such as electronic, electromagnetic, optical, or other signals as will be apparent to a person skilled in the art. The signals may travel via a communications channel, such as the communication network 118, which may be configured to transmit the signals to the various devices that are communicatively coupled to the computer system 500. Examples of the communication channel may include a wired, wireless, and/or optical medium such as cable, fiber optics, a phone line, a cellular phone link, a radio frequency link, and the like. The main memory 506 and the secondary memory 508 may refer to non-transitory computer readable mediums that may provide data that enables the computer system 500 to implement the methods illustrated in FIGS. 3 and 4.

Various embodiments of the disclosure provide the application server 116 for determining a driver score for a driver (such as the plurality of drivers A-D) of a vehicle. The application server 116 may be configured to receive, from the database server 114, the first maintenance data, the first booking data, and the first vehicle data associated with the plurality of vehicles 102-108 and the first driver behavioral data for the plurality of drivers A-D of the plurality of vehicles 102-108. In another embodiment, the application server 116 may be configured to collect, over the first time-interval, the first maintenance data, the first booking data, and the first vehicle data associated with the plurality of vehicles 102-108 and the first driver behavioral data for the plurality of drivers A-D of the plurality of vehicles 102-108. The application server 116 may collect the first maintenance data, the first booking data, the first vehicle data, and the first driver behavioral data from one of the maintenance database 120, the transportation service provider, and the plurality of vehicles 102-108. The application server 116 may be further configured to obtain the plurality of features 214 and the plurality of feature values 216 corresponding to the plurality of features 214 based on the first maintenance data, the first booking data, the first vehicle data, and the first driver behavioral data. The plurality of features 214 are indicators of driver performance and include at least the repair and maintenance cost incurred by each of the plurality of drivers A-D. The application server 116 may be further configured to segregate the plurality of feature values 216 into the plurality of clusters 218. The application server 116 may be configured to train the classifier 210 based on the plurality of clusters 218 to determine the driver score. Further, the application server 116 may be configured to receive, from the database server 114, the first dataset associated with the first vehicle and the first driver. The first dataset is provided as the input to the trained classifier 210. In an embodiment, the application server 116 may be configured to collect the first dataset from one of the maintenance database 120, the transportation service provider, and the plurality of vehicles 102-108. The application server 116 may be further configured to determine the driver score for the first driver based on the output of the trained classifier 210.

Various embodiments of the disclosure provide a non-transitory computer readable medium having stored thereon, computer executable instructions, which when executed by a computer, cause the computer to execute one or more operations for determining the driver score for the first driver of the first vehicle. The one or more operations include receiving, by the application server 116, from the database server 114, the first maintenance data, the first booking data, and the first vehicle data associated with the plurality of vehicles 102-108, and the first driver behavioral data for the plurality of drivers A-D of the plurality of vehicles 102-108. In another embodiment, the one or more operations include collecting, by the application server 116, over the first time-interval, the first maintenance data, the first booking data, the first vehicle data, and the first driver behavioral data. The one or more operations further include obtaining, by the application server 116, the plurality of features 214 and the plurality of feature values 216 corresponding to the plurality of features 214 based on the first maintenance data, the first booking data, the first vehicle data, and the first driver behavioral data. The plurality of features 214 are indicators of driver performance and include at least the repair and maintenance cost incurred by each of the plurality of drivers. The one or more operations further include segregating, by the application server 116, the plurality of feature values 216 into the plurality of clusters 218. The one or more operations further include training, by the application server 116, the classifier 210 based on the plurality of clusters to determine the driver score. The one or more operations further include receiving, by the application server 116, from the database server 114, the first dataset associated with the first vehicle and the first driver. The first dataset is provided as the input to the trained classifier 210. In another embodiment, the one or more operations include receiving, by the application server 116, the first dataset associated with the first vehicle and the first driver. In an embodiment, at least a portion of the first dataset is received from the driver device associated with the first vehicle. The one or more operations further include determining, by the application server 116 the driver score for the first driver based on an output of the trained classifier 210. The one or more operations further include selecting one of the plurality of outcomes for the first driver based on the determined driver score. The plurality of outcomes include onboarding of the first driver onto the transportation service platform associated with the server, incentivizing the first driver, penalizing the first driver, accepting the maintenance request of the first driver, and rejecting the maintenance request of the first driver.

The disclosed embodiments encompass numerous advantages. Exemplary advantages of the disclosed methods include, but are not limited to, ensuring a regular tracking of behavior and performance of each of the plurality of drivers A-D. Further, selection one of the plurality of outcomes, based on the driver score, causes each of the plurality of drivers A-D to be accountable for their behavior and actions towards the plurality of vehicles 102-108. Technological advancements in the application server 116 enables significant reduction in time and human efforts required for tracking the behavior of each of the plurality of drivers A-D and confronting them for their respective behavior. Technological advancements in the application server 116 enables regular tracking of performance of each of the plurality of drivers A-D, thereby significantly reducing a probability of counterfeit incidents, thefts, and forgery by each of the plurality of drivers A-D. Therefore, the disclosed method prevents the transportation service provider from loss of money and time required for investigating the counterfeits, thefts, and forgery by each of the plurality of drivers A-D. Further, the regular tracking of performance of each of the plurality of drivers A-D allows the transportation service provider to further track a change in behavior of each of the plurality of drivers A-D towards the respective plurality of vehicles 102-108. Further, the tracking of negative change in behavior of each of the plurality of drivers A-D allows the transportation service provider to decide a subsequent action in a timely manner. The tracking of positive change in behavior of each of the plurality of drivers A-D also allows the transportation service provider to compensate and appreciate each of the plurality of drivers A-D for good performance. Therefore, the methods and system disclosed herein allows for a seamless management of the plurality of drivers A-D by the transportation service provider based on the driver score of each of the plurality of drivers A-D. The methods and system disclosed herein may be utilized by a vehicle aggregator, a vehicle rental service provider, or the like.

A person of ordinary skill in the art will appreciate that embodiments and exemplary scenarios of the disclosed subject matter may be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however some of the operations may in fact be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Techniques consistent with the disclosure provide, among other features, systems and methods for determining a driver score of a driver of a vehicle. While various exemplary embodiments of the disclosed systems and methods have been described above, it should be understood that they have been presented for purposes of example only, and not limitations. It is not exhaustive and does not limit the disclosure to the precise form disclosed. Modifications and variations are possible in light of the above teachings or may be acquired from practicing of the disclosure, without departing from the breadth or scope.

While various embodiments of the disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. A driver scoring method, comprising:
    receiving, by a server, from a database server, first maintenance data, first booking data, and first vehicle data associated with a plurality of vehicles, and first driver behavioral data for a plurality of drivers of the plurality of vehicles;
    obtaining, by the server, a plurality of features and a plurality of feature values corresponding to the plurality of features based on the first maintenance data, the first booking data, the first vehicle data, and the first driver behavioral data, wherein the plurality of features are indicators of driver performance and include at least a repair and maintenance cost incurred by each of the plurality of drivers, and wherein the plurality of features further include a cost per unit distance incurred by each of the plurality of drivers for one or more components of each of the plurality of vehicles, and at least one of a count of counterfeit incidents caused by each of the plurality of drivers, an overall cost incurred due to one or more accidents caused by each of the plurality of drivers, a repair count of each of the plurality of vehicles, a count of breakdowns of each of the plurality of vehicles, and a count of unscheduled maintenance requested by each of the plurality of drivers;
    segregating, by the server, the plurality of feature values into a plurality of clusters;
    training, by the server, a classifier based on the plurality of clusters;
    receiving, by the server, from the database server, a first dataset associated with a first vehicle and a first driver;
    providing, by the server, the first dataset as an input to the trained classifier;
    and determining, by the server, a driver score for the first driver based on an output of the trained classifier, wherein the output of the classifier is based on the input corresponding to the first data set.

2. The driver scoring method of claim 1, wherein the first dataset comprises second maintenance data, second booking data, and second vehicle data associated with the first vehicle, and second driver behavioral data for the first driver.

3. The driver scoring method of claim 1, further comprising selecting, by the server, one of a plurality of outcomes for the first driver based on the determined driver score.

4. The driver scoring method of claim 3, wherein the plurality of outcomes include at least one of onboarding of the first driver with a transportation service provider associated with the server, incentivizing the first driver, penalizing the first driver, accepting a maintenance request of the first driver, and rejecting the maintenance request of the first driver.

5. The driver scoring method of claim 1, wherein the plurality of features further include a monthly earning of each of the plurality of drivers, and at least one of lean and peak booking hours of each of the plurality of vehicles, an average count of bookings per day for each of the plurality of vehicles, and a distance driven per day by each of the plurality of drivers.

6. The driver scoring method of claim 5, wherein the distance driven per day includes at least one of a dry run distance driven by each of the plurality of drivers, a trip distance driven by each of the plurality of drivers, and an excess distance driven by each of the plurality of drivers.

7. The driver scoring method of claim 1, wherein the plurality of features further include at least one of a tenure of each of the plurality of drivers, a make of each of the plurality of vehicles, a vehicle model of each of the plurality of vehicles, a region of operation of each of the plurality of vehicles, an odometer reading of each of the plurality of vehicles, and an age of each of the plurality of vehicles.

8. The driver scoring method of claim 1, wherein the plurality of features further include at least one of a count of accidents caused by each of the plurality of drivers, a timeliness of scheduled maintenances of each of the plurality of vehicles, and a count of negligence incidents caused by each of the plurality of drivers.

9. The driver scoring method of claim 1, wherein the plurality of feature values include one of a plurality of moving average values, a plurality of moving standard deviation values, and a plurality of cumulative sum values.

10. A driver scoring system, comprising:
a server configured to:
receive, from a database server, first maintenance data, first booking data, and first vehicle data associated with a plurality of vehicles, and first driver behavioral data for a plurality of drivers of the plurality of vehicles;
obtain a plurality of features and a plurality of feature values corresponding to the plurality of features based on the first maintenance data, the first booking data, the first vehicle data, and the first driver behavioral data, and wherein the plurality of features are indicators of driver performance and include at least a repair and maintenance cost incurred by each of the plurality of drivers, wherein the plurality of features further include a cost per unit distance incurred for one or more components of each of the plurality of vehicles by each of the plurality of drivers, and at least one of a count of counterfeit incidents caused by each of the plurality of drivers, an overall cost incurred due to one or more accidents caused by each of the plurality of drivers, a repair count of each of the plurality of vehicles, a count of breakdowns of each of the plurality of vehicles, and a count of unscheduled maintenance requested by each of the plurality of drivers;
segregate the plurality of feature values into a plurality of clusters;
train a classifier based on the plurality of clusters;
receive, from the database server, a first dataset associated with a first vehicle and a first driver;
provide the first dataset as an input to the trained classifier; and
determine a driver score for the first driver based on an output of the trained classifier, wherein the output of the classifier is based on the input corresponding to the first data set.

11. The driver scoring system of claim 10, wherein the first dataset comprises second maintenance data, second booking data, and second vehicle data associated with the first vehicle, and second driver behavioral data for the first driver.

12. The driver scoring system of claim 10, wherein the server is further configured to select one of a plurality of outcomes for the first driver based on the determined driver score, and wherein the plurality of outcomes include at least one of onboarding of the first driver with a transportation service provider associated with the server, incentivizing the first driver, penalizing the first driver, accepting a maintenance request of the first driver, and rejecting the maintenance request of the first driver.

13. The driver scoring system of claim 10, wherein the plurality of features further include a monthly earning of each of the plurality of drivers, and at least one of lean and peak booking hours of each of the plurality of vehicles, an average count of bookings per day for each of the plurality of vehicles, and a distance driven per day by each of the plurality of drivers.

14. The driver scoring system of claim 13, wherein the distance driven per day includes at least one of a dry run distance driven by each of the plurality of drivers, a trip distance driven by each of the plurality of drivers, and an excess distance driven by each of the plurality of drivers.

15. The driver scoring system of claim 10, wherein the plurality of features further include at least one of a tenure of each of the plurality of drivers, a make of each of the plurality of vehicles, a vehicle model of each of the plurality of vehicles, a region of operation of each of the plurality of vehicles, an odometer reading of each of the plurality of vehicles, and an age of each of the plurality of vehicles.

16. The driver scoring system of claim 10, wherein the plurality of features further include at least one of a count of accidents caused by each of the plurality of drivers, a timeliness of scheduled maintenances of each of the plurality of vehicles, and a count of counterfeits caused by each of the plurality of drivers.

17. The driver scoring system of claim 10, wherein the plurality of feature values include one of a plurality of moving average values, a plurality of moving standard deviation values, and a plurality of cumulative sum values.

18. A driver scoring method, comprising:
collecting, by a server, over a first time-interval, first maintenance data, first booking data, and first vehicle data associated with a plurality of vehicles, and first driver behavioral data for a plurality of drivers of the plurality of vehicles;
obtaining, by the server, a plurality of features and a plurality of feature values corresponding to the plurality of features based on the first maintenance data, the first booking data, the first vehicle data, and the first driver behavioral data, wherein the plurality of features are indicators of driver performance and include at least a repair and maintenance cost incurred by each of the plurality of drivers, and wherein the plurality of features further include a cost per unit distance incurred for one or more components of each of the plurality of vehicles by each of the plurality of drivers, and at least one of a count of counterfeit incidents caused by each of the plurality of drivers, an overall cost incurred due to one or more accidents caused by each of the plurality of drivers, a repair count of each of the plurality of vehicles, a count of breakdowns of each of the plurality of vehicles, and a count of unscheduled maintenance requested by each of the plurality of drivers;
segregating, by the server, the plurality of feature values into a plurality of clusters;
training, by the server, a classifier based on the plurality of clusters;
receiving, by the server, a first dataset associated with a first vehicle and a first driver, wherein at least a portion of the first dataset is received from a driver device associated with the first vehicle;
providing, by the server, the first dataset as an input to trained classifier; and
determining, by the server, a driver score for the first driver based on an output of the trained classifier, wherein the output of the classifier is based on the input corresponding to the first data set inputted first dataset.

* * * * *